(12) United States Patent
Yang et al.

(10) Patent No.: US 12,360,371 B2
(45) Date of Patent: Jul. 15, 2025

(54) WAVELENGTH MULTIPLEXED WAVEGUIDE SYSTEM FOR EYE TRACKING

(71) Applicant: Meta Platforms Technologies, LLC, Menlo Park, CA (US)

(72) Inventors: Yang Yang, Redmond, WA (US); Sascha Hallstein, Saratoga, CA (US); Jianbo Zhao, Redmond, WA (US); Peter Johnsen, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 205 days.

(21) Appl. No.: 17/830,339

(22) Filed: Jun. 2, 2022

(65) Prior Publication Data

US 2023/0204959 A1     Jun. 29, 2023

Related U.S. Application Data

(60) Provisional application No. 63/294,341, filed on Dec. 28, 2021.

(51) Int. Cl.
*G02B 27/01*         (2006.01)
*G02B 27/00*         (2006.01)
*G06F 3/01*          (2006.01)

(52) U.S. Cl.
CPC ..... *G02B 27/0172* (2013.01); *G02B 27/0081* (2013.01); *G02B 27/0093* (2013.01); *G06F 3/013* (2013.01); *G02B 2027/0125* (2013.01); *G02B 2027/0138* (2013.01);
(Continued)

(58) Field of Classification Search
CPC ............ G02B 27/0081; G02B 27/0093; G02B 27/017; G02B 27/0172; G02B 2027/0125; G02B 2027/0138; G02B 2027/0174; G02B 2027/0178; G02B 2027/0187; G06F 3/013
See application file for complete search history.

(56) References Cited

U.S. PATENT DOCUMENTS 9,759,913 B2    9/2017   Saarikko et al.
10,268,268 B1 *   4/2019   Trail ...................... H04N 23/56
10,698,483 B1    6/2020   Ouderkirk et al.
(Continued)

OTHER PUBLICATIONS

International Preliminary Report on Patentability for International Application No. PCT/US2022/054034, mailed Jul. 11, 2024, 9 pages.
(Continued)

*Primary Examiner* — Nitin Patel
*Assistant Examiner* — Cory A Almeida
(74) *Attorney, Agent, or Firm* — Greenberg Traurig, LLP

(57) ABSTRACT

An apparatus, system, and method for a waveguide system may be used to support eye tracking in a head mounted display (HMD). The waveguide system may be positioned in a user's field of view and within a lens assembly of the HMD to capture light that is reflected from an eye. The waveguide system may include a waveguide, a first diffraction grating, and a second diffraction grating. The first diffraction grating may be configured to in-couple light of a first wavelength into the waveguide, and the second diffraction grating may be configured to in-couple light of a second wavelength. The first and second diffraction gratings operate together to detect light reflections from an eyebox region.

18 Claims, 16 Drawing Sheets

(52) U.S. Cl.
CPC ............... *G02B 2027/0174* (2013.01); *G02B 2027/0178* (2013.01); *G02B 2027/0187* (2013.01)

(56) References Cited

U.S. PATENT DOCUMENTS

| | | | |
|---|---|---|---|
| 10,963,103 B1 | 3/2021 | Shahmohammadi | |
| 2016/0085300 A1* | 3/2016 | Robbins | H04N 23/20 345/633 |
| 2019/0086674 A1* | 3/2019 | Sinay | G06F 3/013 |
| 2021/0380607 A1* | 12/2021 | Kwon | G02B 5/223 |
| 2023/0375787 A1* | 11/2023 | Montfort | G02B 27/4261 |

OTHER PUBLICATIONS

International Search Report and Written Opinion for International Application No. PCT/US2022/054034, mailed Apr. 5, 2023, 12 pages.

* cited by examiner

WAVELENGTH MULTIPLEXED WAVEGUIDE SYSTEM FOR EYE TRACKING

CROSS-REFERENCE TO RELATED APPLICATIONS

This application claims priority to U.S. provisional Application No. 63/294,341 filed Dec. 28, 2021, which is hereby incorporated by reference.

TECHNICAL FIELD

This disclosure generally relates to optics, and in particular to eye tracking technologies.

BACKGROUND INFORMATION

Eye tracking technology enables head mounted displays (HMDs) to interact with users based on the users' eye movement or eye orientation. Existing eye tracking systems can be technically limited by natural obstructions. For example, eyelashes and eyelids can obstruct images taken of an eye, which may decrease the quality of eye tracking operations.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
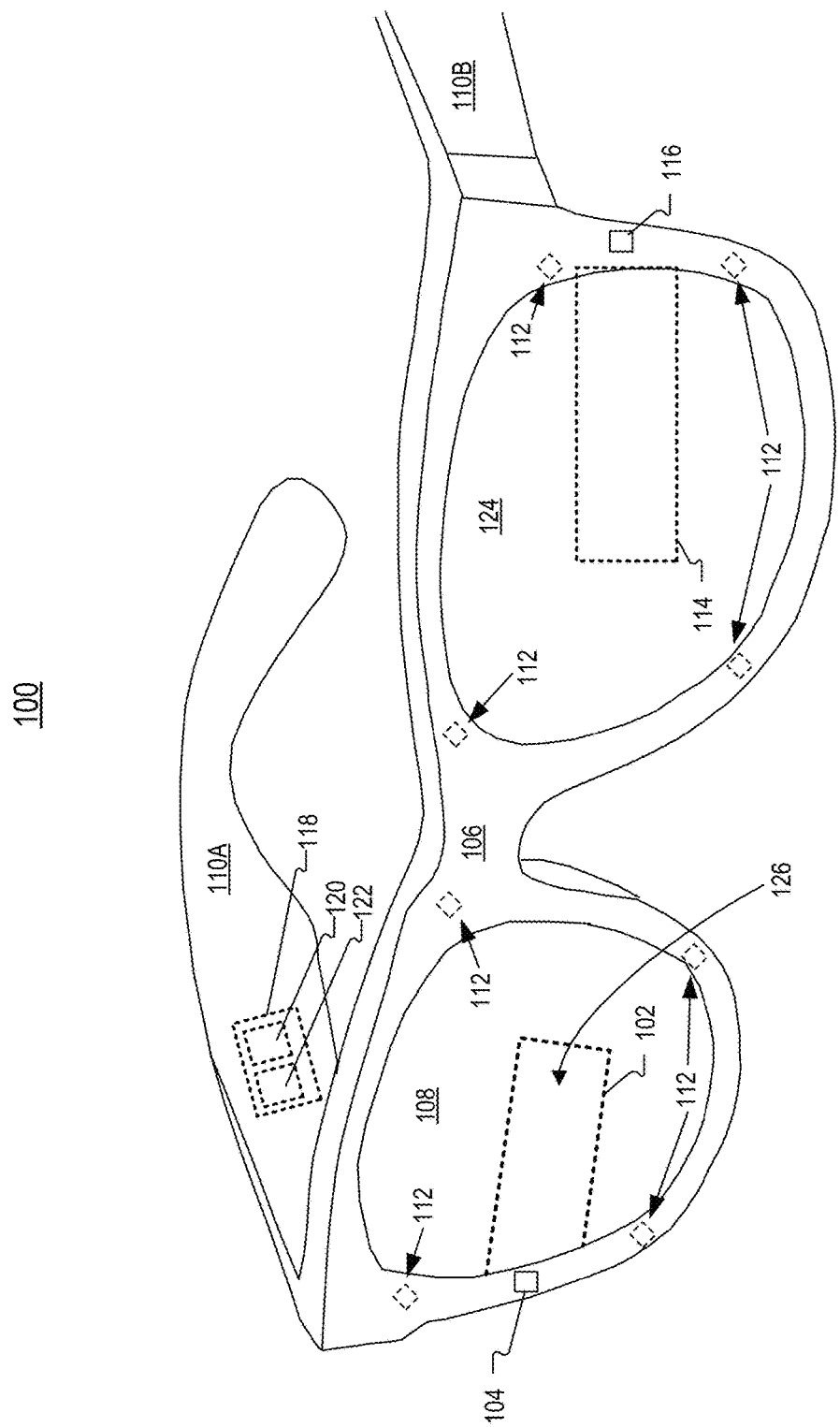
FIG. 1 illustrates a head mounted display, in accordance with aspects of the disclosure.

Embodiments of a wavelength multiplexed waveguide imaging system that supports in-field eye tracking is described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In aspects of this disclosure, visible light may be defined as having a wavelength range of approximately 380 nm to 700 nm. Non-visible light may be defined as light having wavelengths that are outside the visible light range, such as ultraviolet light and infrared light. In aspects of this disclosure, red light may be defined as having a wavelength range of approximately 620 to 750 nm, green light may be defined as having a wavelength range of approximately 495 to 570 nm, and blue light may be defined as having a wavelength range of approximately 450 to 495 nm.

As used herein, the angle of diffraction of light from an optical element (e.g., an optical coupler, a diffraction grating, holographic optical element, etc.) is an angle of displacement of an exit ray with reference to the normal (i.e., 90 degrees) of the exit surface of the optical element.

As used herein, a diffraction grating may include a ruled grating or a holographic grating. A holographic grating may include a substrate with a photosensitive material onto which gratings are recorded (e.g., internal to the substrate). A holographic grating may also be referred to as a holographic optical element (HOE).

Eye tracking functionality expands the services and quality of interaction that head mounted displays (HMDs) can provide to users. Eyelashes and eyelids can block and inhibit the quality of signal (e.g., image) available from an eye when imaging is performed from a periphery of an eye. A significantly better position for imaging light reflections from an eye is from directly in front of the eye. However, placing a camera right in front of an eye could obstruct the vision of a user and could be an annoyance that reduces the quality of a user's experience with the HMD. Disclosed herein are techniques for a waveguide system that captures light from an eye from directly in front of an eye and in the field of vision (in-field) of the eye. The waveguide system directs light from an in-field portion of a lens assembly to an image sensor that may be positioned on or in a frame of the HMD. Additionally, the waveguide system may use wavelength multiplexed diffraction gratings to encode spatial positions of reflections into angles, to wavelength encode portions of the eyebox region, and to expand the eyebox region from which reflections can be detected.

An HMD may include a (e.g., wavelength multiplexed) waveguide system that is at least partially disposed in a lens assembly and in a frame of the HMD to receive light reflections from a user's eye. The waveguide system may direct light reflections (e.g., infrared) from a user's eye to an image sensor to enable distraction-free and in-field imaging of a user's eye. The waveguide system may include two or more in-coupling diffraction gratings, a waveguide, and an out-coupling diffraction grating. The in-coupling diffraction gratings may be configured to in-couple light reflections from an eye (or eyebox region) into the waveguide. The light reflections that are diffracted may include a first-wavelength light and a second-wavelength light. The waveguide may direct (e.g., through total internal reflection (TIR)) the light from the in-coupling diffraction gratings to the out-coupling diffraction grating. The out-coupling diffraction grating may be configured to out-couple the first-wavelength light and the second-wavelength light from the waveguide to an image sensor (e.g., through a lens).

Each of the in-coupling diffraction gratings may be a holographic optical element (HOE) having a plurality of slanted grating planes that are configured to map (or encode) an incident position of each light ray to a TIR angle, where the incident position is with respect to a surface of the in-coupling diffraction grating. In other words, the TIR angle of a particular light ray may be indicative of a position for which the light ray was received on the in-coupling diffraction grating. The out-coupling diffraction grating may then be configured to decode the incident position of each light ray based on the diffraction angle of the particular light ray. In one embodiment, the exit angle or exit position of a light ray from the out-coupling diffraction grating is proportional or is related to the incident position of the particular light ray. The out-coupling diffraction grating may be configured to diffract a band of wavelengths that includes the first-wavelength light and the second-wavelength light.

A controller may be communicatively coupled to the image sensor to receive image data from the image sensor. The controller may use the image data to determine an orientation of the eye(s) and/or to perform one or more eye tracking operations. Based on eye orientations and/or eye tracking data, the HMD may be configured to selectively display information and/or provide or adjust a number of user interface elements in the lens assembly of the HMD, in accordance with aspects of the disclosure.

The in-coupling diffraction gratings and the out-coupling diffraction grating may be implemented as transmissive diffraction gratings or as reflective diffraction gratings. A transmissive diffraction grating operates in transmission on a particular wavelength of light (e.g., within the infrared range) and simply passes or transmits other wavelengths without diffraction. A reflective diffraction grating operates in reflection on a particular wavelength of light (e.g., within the infrared range) and passes or transmits other wavelengths without diffraction. The surface area and/or volume of the in-coupling diffraction gratings may be larger than the surface area and/or volume of the out-coupling diffraction grating to facilitate capturing light reflections from an eyebox and to facilitate focusing light onto an image sensor from within the frame of the HMD. The combined surface area of multiple (e.g., two) in-coupling diffraction gratings may operate to expand the effective area of the eyebox region from which light reflections may be diffracted into the waveguide.

Each of the in-coupling diffraction gratings (and/or the out-coupling diffraction grating) may be a rolled diffraction grating having a number of slanted diffraction gratings. The slanted diffraction gratings diffract light into the waveguide. The slanted diffraction gratings may diffract light with a different diffraction angle on a first side of the in-coupling diffraction grating than on a second side of the in-coupling diffraction grating. The slanted diffraction gratings may have slant angles that change (e.g., increase or decrease) from the first side of the in-coupling diffraction grating to the second side of the in-coupling diffraction, according to aspects of the disclosure. The slanted diffraction gratings may be designed or configured to operate on a particular range of wavelengths (e.g., particular near-infrared or infrared wavelengths). The slanted diffraction gratings may have slant angles, grating lines, and grating periods that are defined based on diffraction angles and the angular bandwidth of the slanted diffraction gratings, in accordance with embodiments of the disclosure.

The apparatus, system, and method for a wavelength multiplexed waveguide system described in this disclosure may enable improvements in eye tracking technologies, for example, to support operations of an HMD. These and other embodiments are described in more detail in connection with FIGS. 1-11.

FIG. 1 illustrates an example head mounted display (HMD) 100 that supports eye tracking from within the field of vision (in-field) of a user, in accordance with embodiments of the disclosure. HMD 100 includes a waveguide system 102 that is configured to in-couple light from an eyebox region and out-couple the light from the eyebox region to an image sensor 104 that is positioned in or on a frame 106, according to an embodiment. Waveguide system 102 is partially disposed within a lens assembly 108 and is partially positioned within frame 106, to support in-field reception of light reflected from an eyebox region, according to an embodiment. An advantage of in-field imaging of the eyebox region and a user's eye is that positioning waveguide system 102 in front of a user's eye reduces obstructions such as eyelids and eyelashes that may reduce the quality of images that can be captured from a user's eye. Another advantage of in-field imaging of the eyebox region may be improved reception of reflections from the user's eye, according to aspects of the disclosure. Waveguide system 102 may be used to support eye tracking, user experience (UX), and other features of HMD 100. An HMD, such as HMD 100, is one type of head mounted display, typically worn on the head of a user to provide artificial reality content to the user. Artificial reality is a form of reality that has been adjusted in some manner before presentation to the user, which may include, e.g., virtual reality (VR), augmented reality (AR), mixed reality (MR), hybrid reality, or some combination and/or derivative thereof.

HMD 100 carries waveguide system 102 and image sensor 104 with frame 106. Frame 106 is coupled to arms 110A and 110B. Lens assembly 108 is mounted to frame 106. Lens assembly 108 may include a prescription optical layer matched to a particular user of HMD 100 or may be non-prescription lens. The illustrated HMD 100 is configured to be worn on or about a head of a wearer of HMD 100.

Lens assembly 108 may appear transparent to a user to facilitate augmented reality or mixed reality to enable a user to view scene light from the environment around her while also receiving image light directed to her eye(s). Consequently, lens assembly 108 may be considered (or include) an optical combiner. Lens assembly 108 may include two or more optical layers that carry portions of waveguide system 102, in an embodiment. In some embodiments, display light from one or more integrated displays is directed into one or both eyes of the wearer of HMD 100.

Waveguide system 102 and image sensor 104 can be configured to capture images of reflections off of a user's eye, according to an embodiment. To generate reflections of light off of the user's eye, HMD 100 may include a number of light sources 112 positioned at one or more locations around frame 106. Light sources 112 are oriented to direct light towards the eyebox region, to illuminate at least one user's eyes. Light sources 112 may emit light that is in the non-visible spectrum. For example, light sources 112 are configured to emit infrared light, for example, having a wavelength in the range of 750 nm to 1500 nm, according to an embodiment. Some of light sources 112 may be configured to emit first-wavelength light that is light having a first wavelength (e.g., 1300 nm), and others of light sources 112 may be configured to emit second-wavelength light that is light of a second wavelength (e.g., 940 nm). Light sources 112 may be light emitting diodes (LEDs), vertical-cavity surface-emitting lasers (VCSELs), micro light emitting diode (micro-LED), an edge emitting LED, a superluminescent diode (SLED), or another type of light source. In one embodiment, light emitted from some of light sources 112 is infrared light centered around 850 nm. Infrared light from other sources may illuminate the eye as well. HMD 100 may be configured to use images of reflections off of a user's eyes to determine an orientation of a user's eye and/or to perform eye tracking operations, according to an embodiment.

HMD 100 includes a controller 118 communicatively coupled to image sensor 104, according to an embodiment. Controller 118 is coupled to image sensor 104 to receive images captured by image sensor 104 using waveguide system 102, according to an embodiment. Controller 118 may include processing logic 120 and one or more memories 122 to analyze image data received from image sensor 104, to determine an orientation of one or more of a user's eyes, to perform one or more eye tracking operations, and/or to display or provide user interface elements in lens assembly 108, according to an embodiment. Controller 118 may include a wired and/or wireless data interface for sending and receiving data and graphic processors, and one or more memories 122 for storing data and computer-executable instructions. Controller 118 and/or processing logic 120 may include circuitry, logic, instructions stored in a machine-readable storage medium, ASIC circuitry, FPGA circuitry, and/or one or more processors. In one embodiment, HMD 100 may be configured to receive wired power. In one embodiment, HMD 100 is configured to be powered by one or more batteries. In one embodiment, HMD 100 may be configured to receive wired data including video data via a wired communication channel. In one embodiment, HMD 100 is configured to receive wireless data including video data via a wireless communication channel.

HMD 100 may include a waveguide system 114 and an image sensor 116 positioned on or around a lens assembly 124 that is on, for example, a left side of frame 106. Waveguide system 114 may include similar features as waveguide system 102, according to an embodiment. Image sensor 116 may be configured to operate similarly to image sensor 104, according to an embodiment. Lens assembly 124 may include similar features and/or layers as lens assembly 108.

Waveguide system 102 may be configured to pass or transmit scene light from a scene side of HMD 100 so that waveguide system 102 appears to be transparent to a user of HMD 100. Waveguide system 102 is also configured to selectively direct light from, for example, a center region 126 of lens assembly 108 to image sensor 104, according to various aspects of the disclosure.

Figure 2:
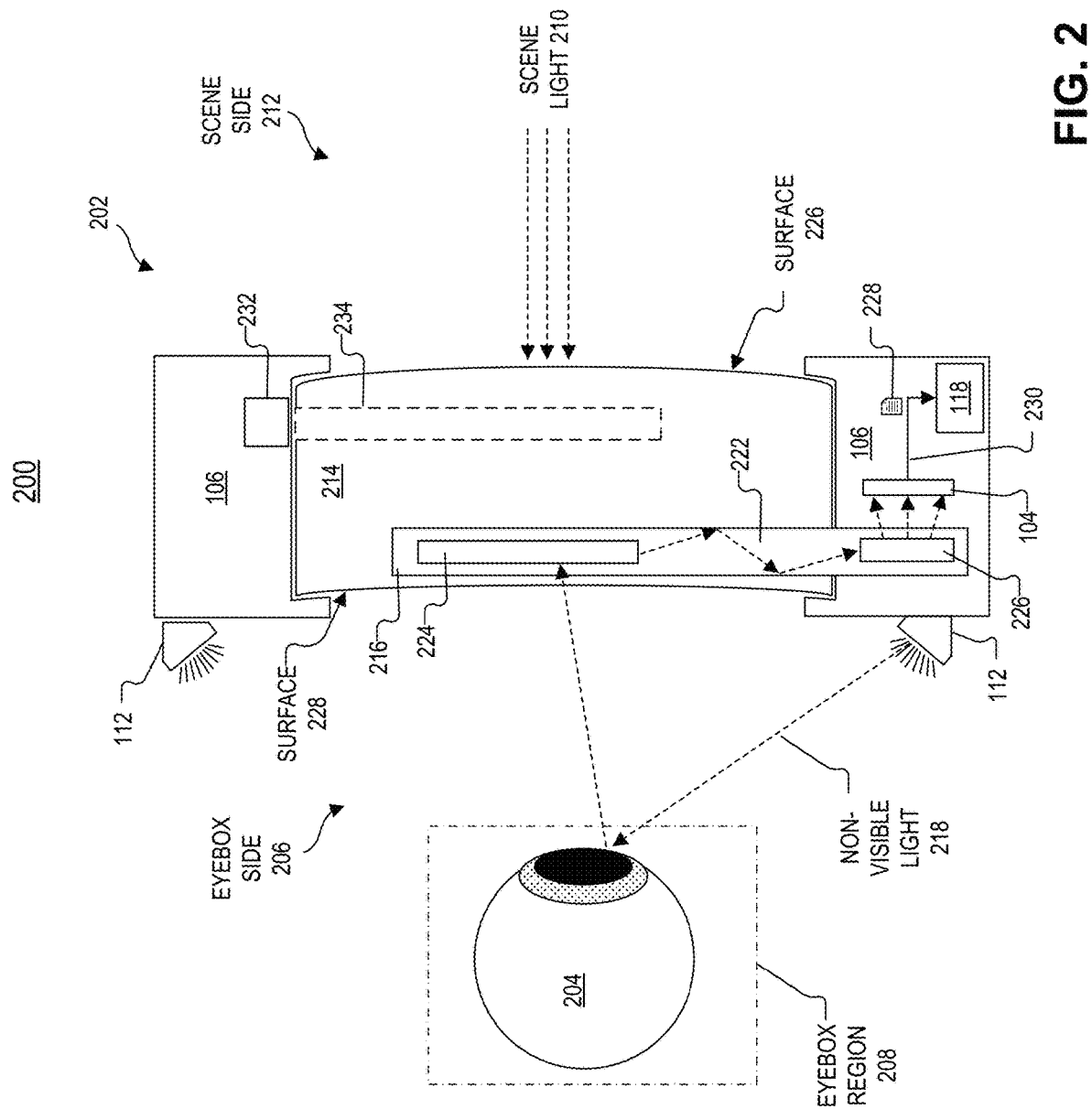
FIG. 2 illustrates an example implementation of a lens assembly for a head mounted display, in accordance with aspects of the disclosure.

FIG. 2 illustrates an example top view of an ocular environment 200, in accordance with various embodiments of the disclosure. Ocular environment 200 includes an HMD 202 and an eye 204, according to an embodiment. HMD 202 is an example implementation of HMD 100. As illustrated, HMD 202 is a partial cross-sectional view of aspects of a head mounted display, according to an embodiment. Eye 204 is positioned on an eyebox side 206 of HMD 202. Eye 204 is positioned in an eyebox region 208 on eyebox side 206 and is positioned to receive scene light 210 from a scene side 212. Scene light 210 passes through a lens assembly 214 to eyebox region 208 and to eye 204, according to an embodiment. Scene light 210 passes from scene side 212 through lens assembly 214 and through waveguide system 216 to eyebox side 206.

Waveguide system 216 is an example implementation of waveguide system 102 and/or 114, according to an embodiment. Waveguide system 216 is configured to receive reflections of non-visible light 218 that becomes incident on surface 220 from eye 204 and/or eyebox region 208, according to an embodiment. Waveguide system 216 includes a waveguide 222, an in-coupling diffraction grating 224, and an out-coupling diffraction grating 226, according to an embodiment.

Waveguide system 216 is configured to receive reflections of non-visible light 218 with in-coupling diffraction grating 224, according to an embodiment. In-coupling diffraction grating 224 in-couples reflected light into waveguide 222, according to an embodiment. In-coupling diffraction grating 224 may represent two or more in-coupling diffraction gratings (e.g., a first diffraction grating configured to diffract first-wavelength light and a second diffraction grating configured to diffract second-wavelength light). By in-coupling the reflected light into waveguide 222, in-coupling diffraction grating 224 directs the reflected light to out-coupling diffraction grating 226, according to an embodiment. Out-coupling diffraction grating 226 receives the reflected light from in-coupling diffraction grating 224, after the reflected light has propagated from in-coupling diffraction grating 224 to out-coupling diffraction grating 226 through total internal reflection (TIR) within waveguide 222, according to an embodiment.

Out-coupling diffraction grating 226 is configured to receive the reflected light and out-couple the reflected light from waveguide 222, according to an embodiment. Out-coupling diffraction grating 226 is configured to provide the received reflected light to image sensor 104, according to an embodiment. As illustrated, out-coupling diffraction grating 226 and image sensor 104 may be positioned within (or on) a portion of frame 106 (e.g., out of the field-of-view of eye 204), according to an embodiment. Out-coupling diffraction grating 226 and a portion of waveguide 222 may be positioned within a portion of frame 106, to facilitate out-coupling of the reflected light from out-coupling diffraction grating 226 to image sensor 104, according to an embodiment. Out-coupling diffraction grating 226 may be configured to diffract a range or band of wavelengths of light that include first-wavelength light and second-wavelength light, according to an embodiment.

Image sensor 104 is configured to convert the received reflected light into electrical signals. The electrical signals may be representative of the reflected light received by in-coupling diffraction grating 224, according to an embodiment. Image sensor 104 converts the received reflected light into image data 228 and provides image data 228 to controller 118 through a communications channel 230, according to an embodiment. In other words, controller 118 may be communicatively coupled to receive image data 228 from image sensor 104. Controller 118 may employ one or more of a variety of techniques to determine an orientation of eye 204 and perform one or more eye tracking operations based on image data 228, according to an embodiment.

HMD 202 may include a projector 232 and a display 234 that are configured to provide information and/or user interface elements to eyebox region 208 for viewing by a user of HMD 202, according to an embodiment. Display 234 may include a liquid crystal display (LCD), an organic light emitting diode (OLED) display, micro-LED display, quantum dot display, pico-projector, or liquid crystal on silicon (LCOS) display for directing image light to a wearer of HMD 202. Projector 232 may be positioned in or on frame 106, and display 234 may be at least partially positioned within lens assembly 214, according to an embodiment. Display 234 may be transparent and may be configured to allow scene light 210 to pass through lens assembly 214 to eyebox region 208, according to an embodiment. Projector 232 and display 234 may be communicatively coupled to receive instructions and/or information from controller 118 and may be configured to project information at least partially based on an orientation of eye 204, according to an embodiment.

Lens assembly 214 is illustrated as a single optical layer for illustrative purposes. Lens assembly 214 may be implemented as a single optical layer, as illustrated, or may be implemented as two or more optical layers coupled together to include waveguide system 216 and display 234, according to an embodiment.

Figure 3:
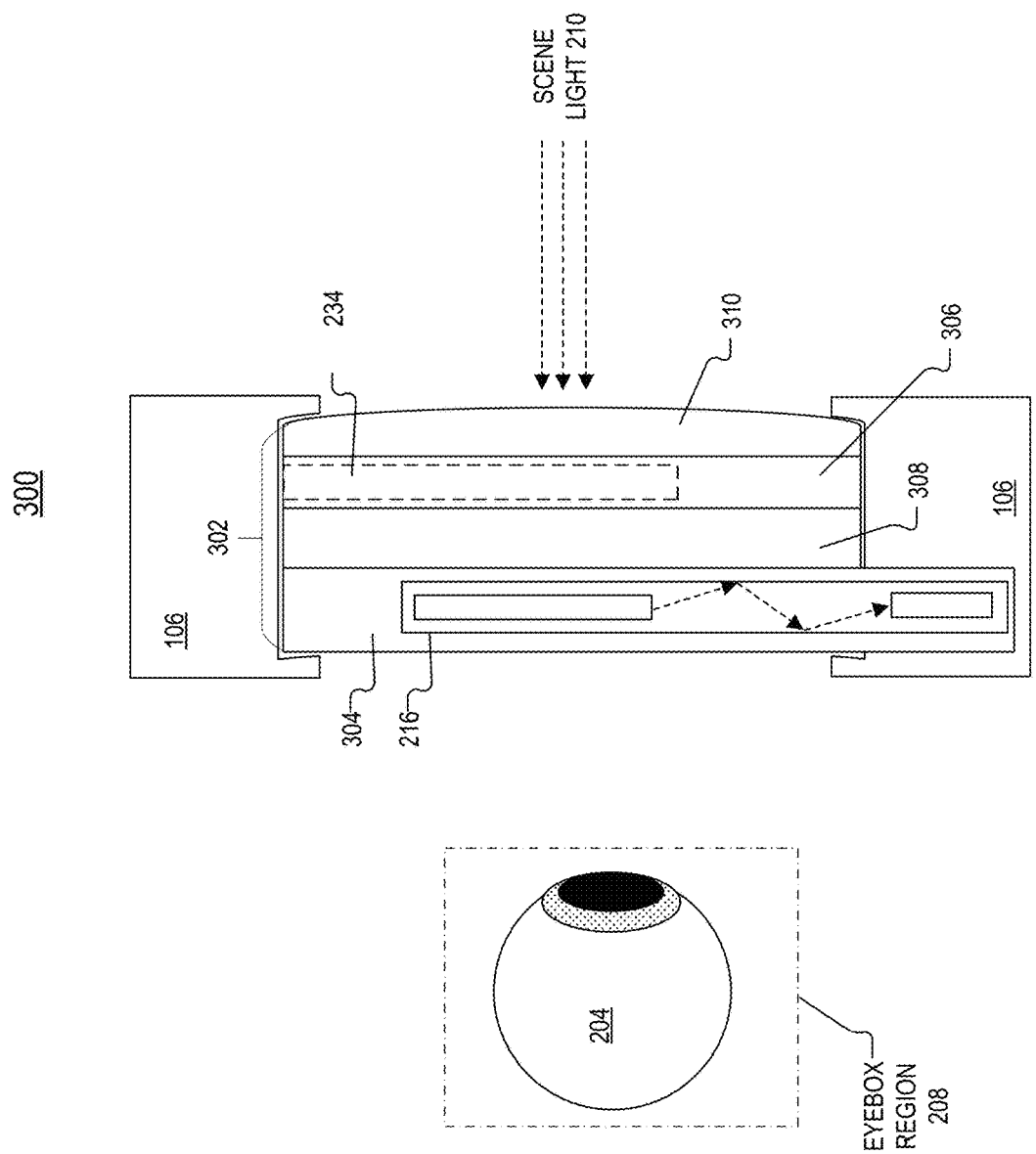
FIG. 3 illustrates an example implementation of a lens assembly, in accordance with aspects of the disclosure.

FIG. 3 illustrates a top view of an HMD 300, according to an embodiment. HMD 300 includes a lens assembly 302 that includes a number of optical layers, according to an embodiment. Lens assembly 302 is an example implementation of lens assembly 214, according to an embodiment. Lens assembly 302 includes a waveguide optical layer 304 and a display optical layer 306, according to an embodiment. Waveguide optical layer 304 is coupled to display optical layer 306 to transmit scene light 210 to eyebox region 208, according to an embodiment. Lens assembly 302 may include one or more additional layers, such as optical layer 308 and optical layer 310 to provide optical power, spacing, and one or more additional features or characteristics to support operation of HMD 300, according to an embodiment.

Figure 4A:
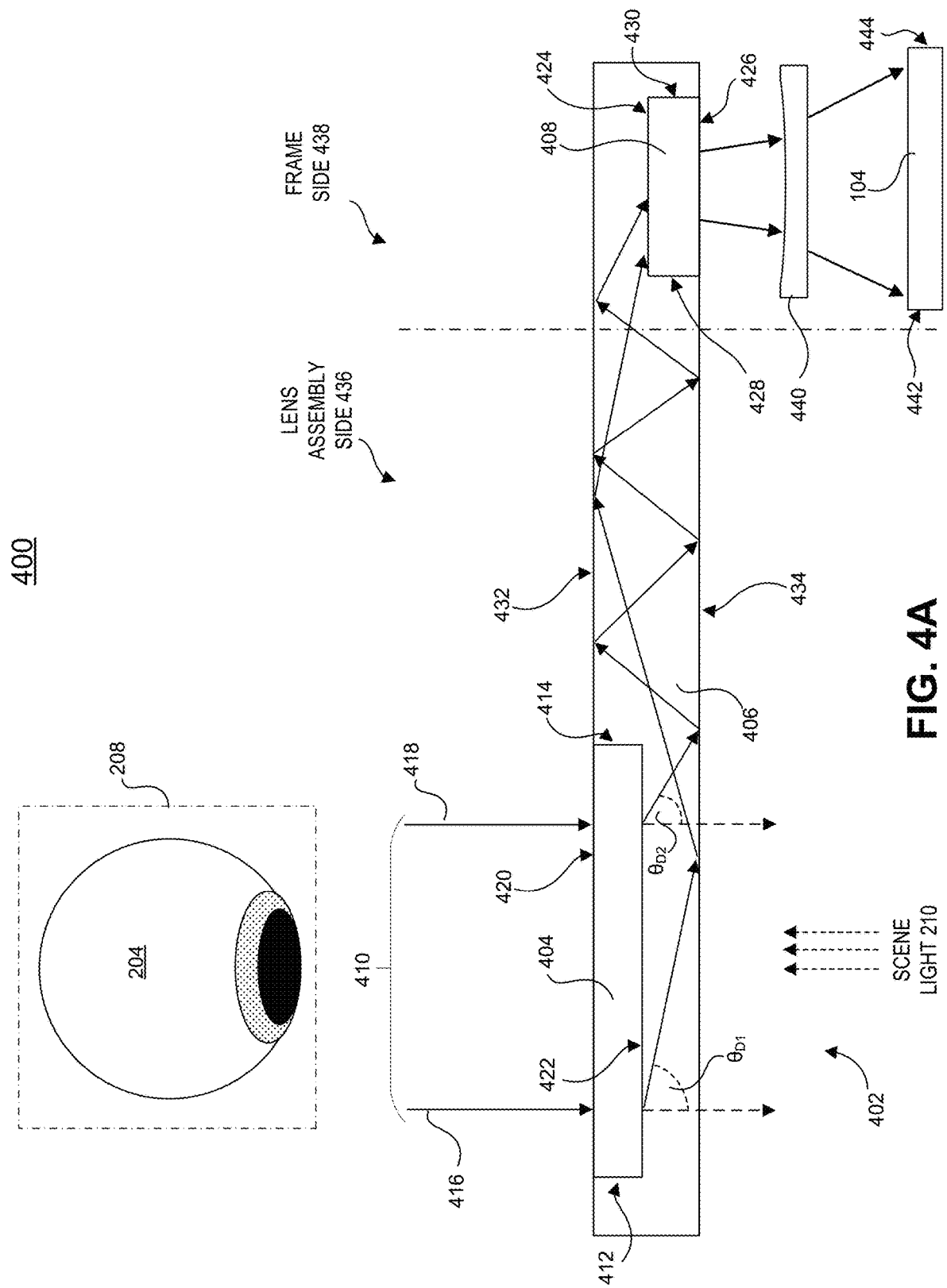
FIGS. 4A and 4B illustrate example implementations of a waveguide system that may be used in an HMD to support eye tracking operations, in accordance with aspects of the disclosure.
Figure 4B:
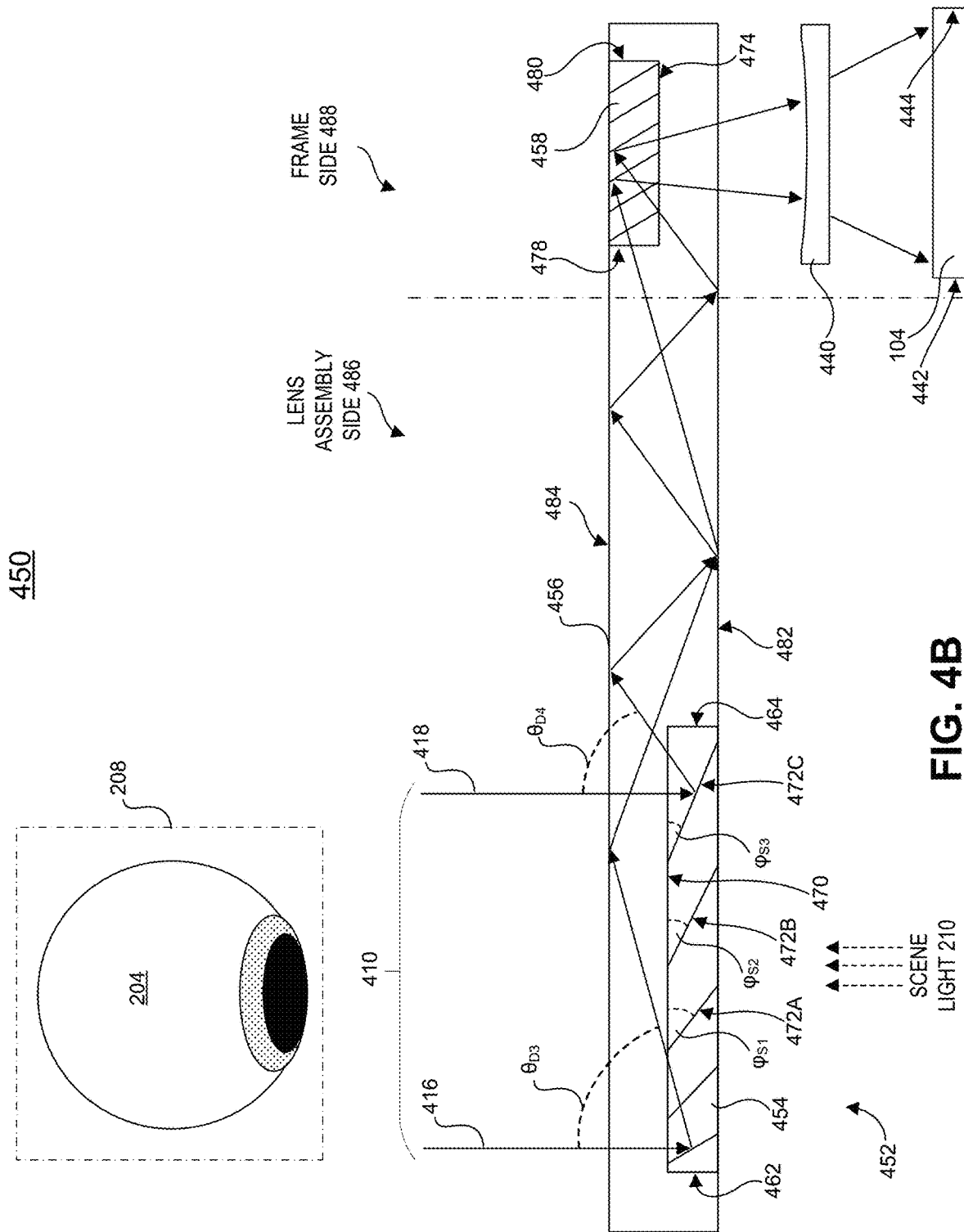

FIGS. 4A and 4B illustrate example embodiments of a waveguide imaging system that may be implemented into one or more of the disclosed HMDs, in accordance with aspects of the disclosure.

FIG. 4A illustrates a waveguide imaging system 400, according to an embodiment. Waveguide imaging system 400 includes a waveguide system 402 that is configured to receive light (e.g., reflected infrared light) from eyebox region 208 and provide the light to image sensor 104, according to an embodiment. Waveguide system 402 is an example implementation of waveguide system 102 (shown in FIG. 1) and/or waveguide system 216 (shown in FIG. 2). Waveguide system 402 uses a diffraction grating 404 to in-couple light into a waveguide 406 and uses a diffraction grating 408 to out-couple light from waveguide 406 to image sensor 104, according to an embodiment. Diffraction grating 404, waveguide 406, and diffraction grating 408 are optical elements that at least partially define waveguide system 402 and that operate together to direct light from eyebox region 208 to image sensor 104, according to an embodiment.

Diffraction grating 404 is a transmissive optical grating that is configured to operate in transmission to diffract some wavelengths of light while passing (without diffraction) other wavelengths of light. Diffraction grating 404 may be configured to diffract light having a wavelength in the infrared range of wavelengths while passing other wavelengths of light (e.g., the visible band of wavelengths) without diffraction. Diffraction grating 404 in-couples light 410 from eyebox region 208 (e.g., from eye 204) into waveguide 406 so that waveguide 406 reflects (e.g., with TIR) light 410 to diffraction grating 408.

Diffraction grating 404 includes a first end 412 and a second end 414 and is configured to diffract light rays from first end 412 differently than from second end 414, according to an embodiment. For example, diffraction grating 404 may be configured to diffract light rays 416 on first end 412 with a first diffraction angle $\theta_{D1}$ and may be configured to diffract light rays 418 on second end 414 with a second diffraction angle $\theta_{D2}$. In one embodiment, first diffraction angle $\theta_{D1}$ is a greater angle than second diffraction angle $\theta_{D2}$ so that diffraction grating 404 diffracts light 410 more aggressively from first end 412 and diffracts light 410 less aggressively from second end 414 to reduce the likelihood that light rays reflected within waveguide 406 are reflected back onto diffraction grating 404. Diffraction grating 404 is configured to diffract light at diffraction angles that progressively become smaller from first end 412 to second end 414, according to an embodiment. Alternatively, diffraction grating 404 is configured to diffract light at diffraction angles that progressively become larger from first end 412 to second end 414, according to an embodiment. Light rays 416 and 418 are representative of a large number of light rays (e.g., light 410) that are received by an entrance surface 420 and that are diffracted out of an exit surface 422 at diffraction angles that change from first end 412 to second end 414, according to various aspects of the disclosure.

Diffraction grating 408 is configured to receive light rays 416 and 418 with an entrance surface 424 and is configured to direct light rays 416 and 418 to image sensor 104. Diffraction grating 408 is a transmissive grating that is configured to operate in transmission to diffract some wavelengths of light while passing other wavelengths of light. Diffraction grating 408 is a transmissive diffraction grating that out-couples light rays 416 and 418 from waveguide 406 to image sensor 104, according to an embodiment. Diffraction grating 408 may be configured to diffractively out-couple light rays 416 and 418 from waveguide 406 to image sensor 104, according to an embodiment. Similar to diffraction grating 404, diffraction grating 408 may be configured to diffract light from exit surface 426 at a different angle from a first side 428 than from a second side 430. Diffraction grating 408 may be configured to diffract light from first side 428 at a smaller diffraction angle than from second side 430. Diffraction grating 408 may be configured to emit light at diffraction angles that gradually or progressively change from first side 428 to second side 430. The diffraction angles of emitted light rays from exit surface 426 progressively increase from first side 428 to second side 430, according to an embodiment. The diffraction angles of emitted light rays from exit surface 426 progressively decrease from first side 428 to second side 430, according to an embodiment.

Diffraction grating 404 is positioned within waveguide 406 near a surface 432 of waveguide 406 to enable diffraction grating 404 to in-couple light 410 into waveguide 406 and to enable diffraction grating 404 to direct light 410 towards diffraction grating 408, according to an embodiment. Entrance surface 420 of diffraction grating 404 defines or makes up at least part of surface 432 of waveguide 406, so that part of entrance surface 420 and surface 432 are the same surface, according to an embodiment. Diffraction grating 404 is positioned in waveguide 406 on a lens assembly side 436 of waveguide 406, according to an embodiment. Lens assembly side 436 of waveguide 406 represents a portion of waveguide 406 that transmits scene light 210 to eyebox region 208, according to an embodiment.

Diffraction grating 408 is positioned within waveguide 406 near a surface 434 of waveguide 406 to enable diffraction grating 408 to out-couple light 410 out of waveguide 406 and to enable diffraction grating 408 to direct light 410 towards image sensor 104, according to an embodiment. Exit surface 426 of diffraction grating 408 defines or makes up at least part of surface 434 of waveguide 406, so that part of exit surface 426 and surface 434 are the same surface, according to an embodiment. Diffraction grating 408 is positioned in waveguide 406 on a frame side 438 of waveguide 406, according to an embodiment. Frame side 438 of waveguide 406 represents a portion of waveguide 406 that is at least partially positioned within or on a surface of a frame of an HMD to enable out-coupling of light to image sensor 104, according to an embodiment.

Waveguide imaging system 400 may optionally include a lens 440 that is positioned between waveguide 406 and image sensor 104. Lens 440 may be constructed from a single optical layer or may include a number of optical layers coupled together to focus light from exit surface 426 onto image sensor 104. In one embodiment, diffraction grating 408 and lens 440 are configured to focus light from first end 412 of diffraction grating 404 onto a first end 442 of image sensor 104 and are configured to focus light from second end 414 of diffraction grating 404 onto a second end 444 of image sensor 104, or vice versa.

FIG. 4B illustrates a waveguide imaging system 450, according to an embodiment. Waveguide imaging system 450 includes a waveguide system 452 that is configured to receive light 410 from eyebox region 208 and selectively provide light 410 to image sensor 104, according to an embodiment. Waveguide system 452 is an example implementation of waveguide system 102 (shown in FIG. 1) and/or waveguide system 216 (shown in FIG. 2). Waveguide system 452 employs one or more reflective volume Bragg gratings (VBG) to couple light 410 to image sensor 104, according to an embodiment. By using VBGs, waveguide system 452 may advantageously operate with a reduction or elimination (e.g., below 0.01%) of visible rainbow artifacts that may occur in in-field waveguide imaging systems. More specifically, waveguide system 452 may operate with transmissive rainbow artifacts that are below 0.01% and may operate with virtually non-existent reflective rainbow artifacts, according to some implementations. In an embodiment, waveguide system 452 uses a reflective diffraction grating 454 to in-couple light into a waveguide 456 and uses a reflective diffraction grating 458 to out-couple light from waveguide 456 to image sensor 104, according to an embodiment.

Diffraction grating 454 is a reflective diffraction grating (e.g., a reflective VBG) that is configured to operate in reflection to diffract some wavelengths of light while passing (not operating on) other wavelengths of light. Diffraction grating 454 may be configured to diffract light having a wavelength (e.g., 850 nm) in the infrared range of wavelengths while passing other wavelengths of light (e.g., the visible band of wavelengths) without diffraction. Diffraction grating 454 in-couples light 410 from eyebox region 208 (e.g., from eye 204) into waveguide 456 so that waveguide 456 reflects (e.g., with TIR) light 410 to diffraction grating 458.

Diffraction grating 454 includes a first end 462 and a second end 464 and is configured to diffract light rays from first end 462 differently than light rays from second end 464, according to an embodiment. For example, diffraction grating 454 may be configured to diffract light rays 416 on first end 462 with a first diffraction angle $\theta_{D3}$ and may be configured to diffract light rays 418 on second end 464 with a second diffraction angle $\theta_{D4}$. In one embodiment, first diffraction angle $\theta_{D3}$ is a greater angle than second diffraction angle $\theta_{D4}$ so that diffraction grating 454 diffracts light 410 more aggressively from first end 462 and diffracts light 410 less aggressively from second end 464 to reduce the likelihood that light rays are reflected back onto diffraction grating 454. Diffraction grating 454 is configured to diffract light at diffraction angles that progressively become smaller from first end 462 to second end 464, according to an embodiment. Diffraction grating 454 is configured to diffract light at diffraction angles that progressively become larger from first end 462 to second end 464, according to an embodiment. Light rays 416 and 418 are representative of a large number of light rays (e.g., light 410) that are received by a surface 470 and that are diffracted back out of surface 470 at diffraction angles that change from first end 462 to second end 464, according to various aspects of the disclosure.

Diffraction grating 454 is a rolled diffraction grating having a number of slanted grating planes 472 that change (e.g., progressively increase or decrease) the diffraction angle of exiting light rays from first end 462 to second end 464 of diffraction grating 454. Slanted grating planes 472 change the diffraction angle of exiting light rays based on the slant angles of slanted grating planes 472. Diffraction grating 454 maps each position of incident light rays to one or more particular total internal reflection (TIR) angles inside waveguide 456, according to an embodiment. In other words, diffraction grating 454 encodes information onto received light rays by associating a light ray's incident position (on diffraction grating 454) with a TIR angle within waveguide 456, according to an embodiment. The particular TIR angle by which a light ray is received by diffraction grating 458 provides an indication of the light ray's incident position onto diffraction grating 454 (e.g., from eyebox region 208), according to an embodiment. Diffraction grating 458 is configured to decode the light ray's incident position based on the light ray's particular diffraction angle, according to an embodiment. The particular angle by which a light ray exits waveguide 456 and/or is received by image sensor 104 provides an indication of the light ray's incident position and/or angle of incidence onto diffraction grating 454, according to an embodiment.

Slanted grating planes 472 (individually, slanted grating plane 472A, 472B, 472C, etc.) are associated with slant angles φ (individually, slant angle $\varphi_{s1}$, $\varphi_{s2}$, $\varphi_{s3}$) that at least partially define the angle of slanted grating planes 472. For clarity in the illustration, only a limited number of the illustrated slanted grating planes are labeled. However, in practice the number of grating planes having, for example, a few microns of spacing between each other would be difficult to fully illustrate. Slant angles φ are defined with respect to surface 470 of diffraction grating 454, according to an embodiment. Slant angles φ may also be defined with respect to the intersection of surface 470 and the normal to each of slanted grating planes 472, according to an embodiment. Slant angles φ and slanted grating planes 472 are at least partially defined by the techniques described in association with FIG. 5, FIG. 6, and FIG. 7, according to embodiments of the disclosure.

Diffraction grating 458 is configured to receive light rays 416 and 418 (e.g., with a surface 474) and is configured to direct light rays 416 and 418 to image sensor 104. Diffraction grating 458 is a reflective diffraction grating that is configured to operate in reflection to diffract some wavelengths of light (e.g., within the infrared wavelengths) while passing other wavelengths of light (e.g., visible wavelengths). Diffraction grating 458 is a reflective diffraction grating that out-couples light rays 416 and 418 from waveguide 456 to image sensor 104, according to an embodiment. Similar to diffraction grating 454, diffraction grating 458 may be configured to diffract light from surface 474 at a different angle from a first side 478 than from a second side 480. Diffraction grating 458 may be configured to diffract light from first side 478 at a smaller diffraction angle than from second side 480. Diffraction grating 458 may be configured to emit light at diffraction angles that gradually or progressively change from first side 478 to second side 480. The diffraction angles of light rays emitted from surface 474 progressively increase from first side 478 to second side 480, according to an embodiment. The diffraction angles of light rays emitted from surface 474 progressively decreases from first side 478 to second side 480, according to an embodiment.

Diffraction grating 454 is positioned within waveguide 456 near a surface 482 of waveguide 456 to enable diffraction grating 454 to in-couple light 410 into waveguide 456 and to enable diffraction grating 454 to direct light 410 towards diffraction grating 458, according to an embodiment. At least one surface of diffraction grating 454 and surface 482 are on the same plane or at least partially define the same surface, according to an embodiment. Diffraction grating 454 is positioned in waveguide 456 on a lens assembly side 486 of waveguide 456, according to an embodiment. Lens assembly side 486 of waveguide 456 represents a portion of waveguide 456 that transmits scene light 210 to eyebox region 208, according to an embodiment.

Diffraction grating 458 is positioned within waveguide 456 near a surface 484 of waveguide 456 to enable diffraction grating 458 to out-couple light 410 out of waveguide 456 and to enable diffraction grating 458 to direct light 410 towards image sensor 104, according to an embodiment. At least one surface of diffraction grating 458 and surface 484 are on the same plane or at least partially define the same surface, according to an embodiment. Diffraction grating 458 is positioned in waveguide 456 on a frame side 488 of waveguide 456, according to an embodiment. Frame side 488 of waveguide 456 represents a portion of waveguide 456 that is at least partially positioned within or on a surface of a frame of an HMD to enable out-coupling of light to image sensor 104, according to an embodiment.

Waveguide imaging system 450 may optionally include lens 440 that is positioned between waveguide system 452 and image sensor 104. Lens 440 may be constructed from a single optical layer or may include a number of optical layers coupled together to focus light from diffraction grating 458 onto image sensor 104. In one embodiment, diffraction grating 458 and lens 440 are configured to focus light from first end 462 of diffraction grating 454 onto first end 442 of image sensor 104 and are configured to focus light from second end 464 of diffraction grating 454 onto second end 444 of image sensor 104.

Figure 5:
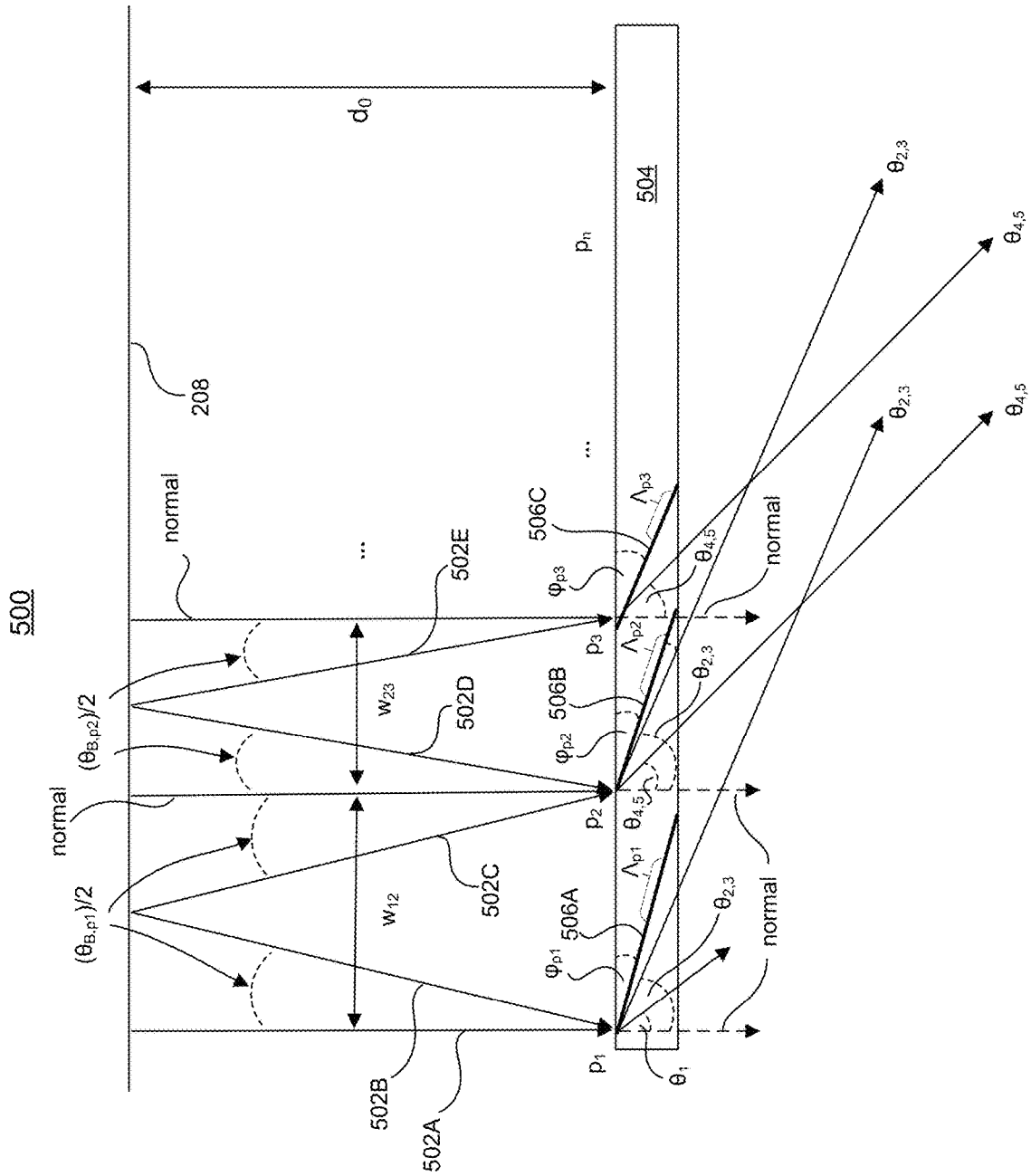
FIG. 5 illustrates a diagram that shows techniques for defining characteristics of a rolled diffraction grating, in accordance with aspects of the disclosure.

FIG. 5 illustrates a diagram 500 for defining and constructing one or more characteristics of waveguide systems 402 and/or 452, in accordance with embodiments of the disclosure. Diagram 500 illustrates light rays 502 (individually, light ray 502A, 502B, 502C, 502D, 502E) incident upon an optical element 504 at a variety of positions p (individually, position $p_1$, $p_2$, $p_3$, $p_n$) to determine diffraction angles, grating periods, and slant angles of slanted grating planes 506 (individually, slanted grating plane 506A, 506B, 506C), in accordance with aspects of the disclosure. Optical element 504 may be a transmissive or reflective diffraction grating (e.g., a holographic optical element), according to various aspects of the disclosure.

To define a first slant angle $\varphi_{p1}$ at a first point $p_1$, a diffraction angle $\theta_1$ is defined to be 80° for a first light ray 502A. First light ray 502A originates from eyebox region 208 that is a distance do from optical element 504. First ray 502A has an incident angle of 0°. First slant angle $\varphi_{p1}$ of a first slanted grating plane 506A may be adjusted until diffraction angle $\theta_1$ for first light ray 502A is 80°. A grating period $\Lambda_{p1}$ is a transversal distance between adjacent grating lines on slanted grating planes 506 and is based on the wavelength of light being selectively diffracted (e.g., 850 nm). Grating period $\Lambda_{p1}$ and slant angle $\varphi_{p1}$ are adjusted at $p_1$ until diffraction angle $\theta_1$ is 80° for first light ray 502A. Diffraction angle $\theta_1$ may be measured from a normal to a surface (e.g., exit surface) of optical element 504.

Once the grating period $\Lambda_{p1}$ and slant angle $\varphi_{p1}$ for first slanted grating plane 506A have been determined at first point $p_1$ to achieve a particular diffraction angle, an angular bandwidth $\theta_{B,p1}$ at first point $p_1$ is determined. As an example, angular bandwidth $\theta_{B,p1}$ may be determined by directing various light rays at first point $p_1$ with different incident angles until the angle of diffraction exceeds a predetermined threshold.

Having determined angular bandwidth $\theta_{B,p1}$, a second light ray 502B is emitted or directed to first point $p_1$ at an incident angle of $-\theta_{B,p1}/2$ (negative theta divided by 2). An angle $\theta_{2,3}$ is the resulting diffraction angle from first point $p_1$ of second light ray 502B. Angle $\theta_{2,3}$ may be measured from a normal to a surface (e.g., exit surface) of optical element 504.

At a second point $p_2$, a grating period $\Lambda_{p2}$ and a slant angle $\varphi_{p2}$ of a second slanted grating plane 506B are adjusted to so that a third light ray 502C also diffracts at diffraction angle $\theta_{2,3}$. Third light ray 502C is emitted or directed to second point $p_2$ with an incident angle of $\theta_{B,p1}/2$ (positive theta divided by 2). Second point $p_2$ is determined as a distance $w_{12}$ from first point $p_1$ along the surface of optical element 504, according to an embodiment. Distance $w_{12}$ may be defined in accordance with Equation 1, which is:

$$w_{12}=2*d_0*\tan(\theta_{B,p1}/2).$$

To determine a grating period $\Lambda_{p3}$ and a slant angle $\varphi_{p3}$ at a third point $p_3$, a diffraction angle $\theta_{4,5}$ is determined from second point $p_2$. Diffraction angle $\theta_{4,5}$ may be determined based on an angular bandwidth $\theta_{B,p2}/2$ of second point p2. Angular bandwidth $\theta_{B,p2}$ may be determined by directing various light rays at second slanted grating plane 506B at second point $p_2$ from various incident angles until the angle of diffraction exceeds a predetermined threshold. Fourth light ray 502D is emitted or directed towards second point p2 at an incident angle $-\theta_{B,p2}/2$ (negative theta divided by 2), and the resulting diffraction angle of fourth light ray 502D is diffraction angle $\theta_{4,5}$. Angle $\theta_{4,5}$ may be measured from a normal to a surface (e.g., exit surface) of optical element 504.

Grating period $\Lambda_{p3}$ and slant angle $\varphi_{p3}$ of a third slanted grating plane 506C are determined at third point p3, at least partially based on diffraction angle $\theta_{4,5}$. Third point $p_3$ is determined as a distance $w_{23}$ from second point $p_2$ along the surface of optical element 504, according to an embodiment. Distance $w_{23}$ may be defined in accordance with Equation 2, which is:

$$w_{23}=2*d_0*\tan(\theta_{B,p2}/2).$$

Values for grating period $\Lambda_{p3}$ and slant angle $\varphi_{p3}$ are determined by adjusting grating period $\Lambda_{p3}$ and slant angle $\varphi_{p3}$ until a fifth light ray 502E diffracts from slanted grating plane 506C at diffraction angle $\theta_{4,5}$. Fifth light ray 502E is emitted or directed towards third point $p_3$ at an incident angle of $\theta_{B,p2}/2$ (theta divided by 2) while adjusting grating period $\Lambda_{p3}$ and slant angle $\varphi_{p3}$ according to an embodiment.

The general sequence discussed for determining characteristics of slanted grating planes 506 may be repeatedly applied for the entire length of optical element 504 to generate an optical element with slanted grating planes that operate to diffract light in accordance with the diffraction gratings described herein (e.g., diffraction grating 404, 454), in accordance with embodiments of the disclosure. This sequence may be repeated until a critical diffraction angle is reached where diffracted light rays from slanted grating planes no longer experience TIR within the waveguide.

In some embodiments, the process of identifying and defining characteristics of optical element 504 is performed by one or more processors configured to operate fabrication or manufacturing equipment used to, for example, record and/or test optical elements, diffraction gratings, waveguide systems, waveguide imaging systems, and/or HMDs, according to various embodiments.

Figure 6:
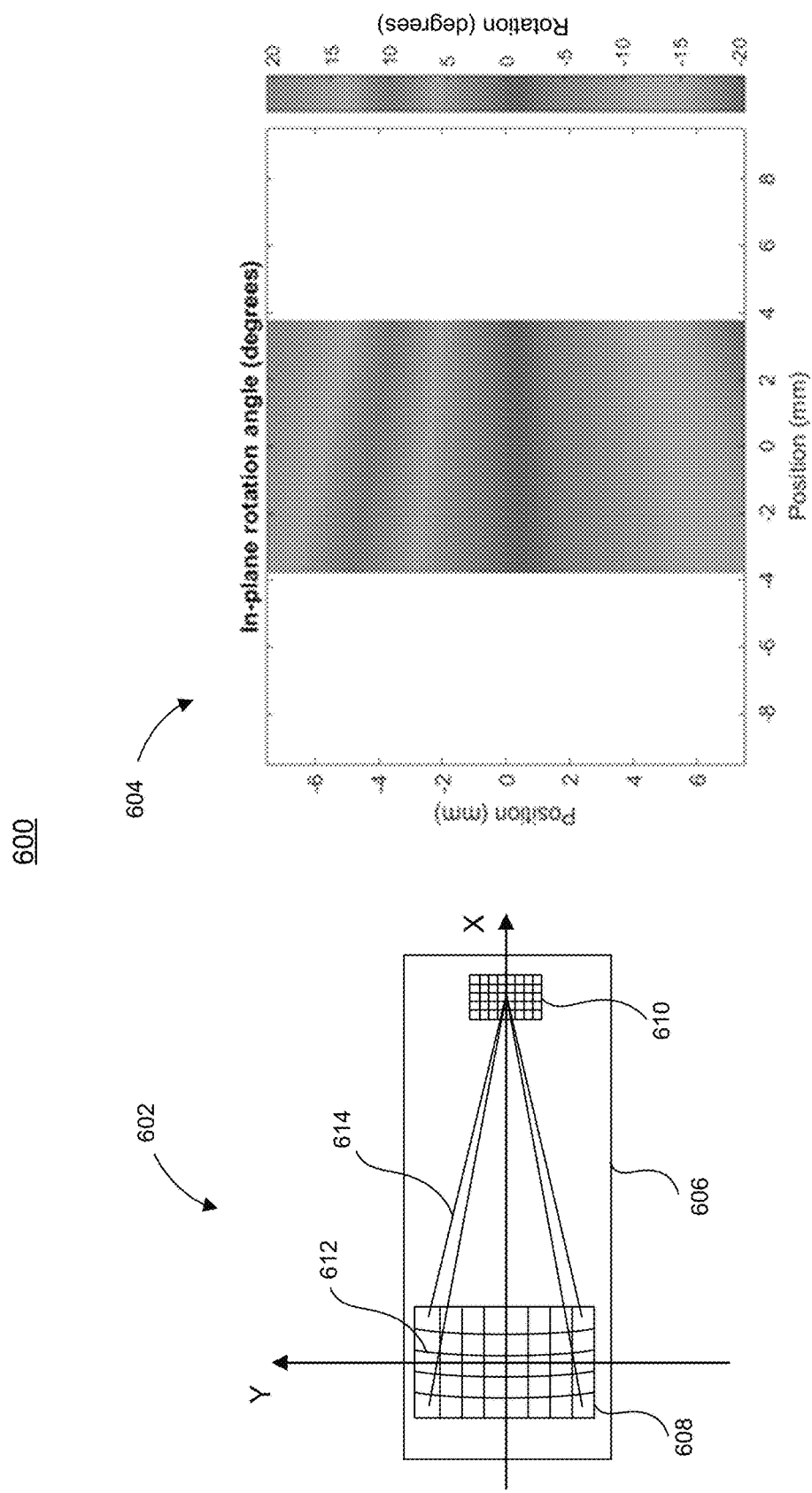
FIG. 6 illustrates a diagram of a top view of a waveguide system and a rotational angle chart for a rolled diffraction grating, in accordance with aspects of the disclosure.

FIG. 6 illustrates a diagram 600 that shows optical characteristics of waveguide systems and diffraction gratings, according to aspects of the disclosure. Diagram 600 includes a top view of a waveguide system 602 that at least partially operates with rotation angles illustrated in chart 604, according to an embodiment. Waveguide system 602 includes a waveguide 606, an in-coupling diffraction grating 608, and an out-coupling diffraction grating 610, according to an embodiment. Waveguide system 602 is an example of a top view of waveguide systems 402 and/or 452, according to an embodiment. In-coupling diffraction grating 608 is an example top view of diffraction grating 404 and/or 454, according to an embodiment. Out-coupling diffraction grating 610 is an example top view of diffraction grating 408 and/or 458, according to an embodiment.

In-coupling diffraction grating 608 includes slanted grating planes 612 that are arcuately and concavely curved with respect to the direction of out-coupling diffraction grating 610, according to an embodiment. The curvature of slanted grating planes 612 directs light rays 614 (at various angles) towards out-coupling diffraction grating 610 and enables out-coupling diffraction grating 610 to have a smaller receiving surface area than the emitting surface area of in-coupling diffraction grating 608, according to an embodiment. The smaller surface area of out-coupling diffraction grating 610 enables easier concealment and placement of out-coupling diffraction grating 610 within or on a frame of an HMD, according to an embodiment. The larger surface area of in-coupling diffraction grating 608 may enable reception and in-coupling of more light from an eyebox region of an HMD or from a user's eye for an HMD. Chart 604 show how many degrees of rotation a light ray (e.g., light ray 614) experiences based on the positive and negative displacement of the light ray along the x-axis and y-axis of in-coupling diffraction grating 608, according to one embodiment.

Figure 7:
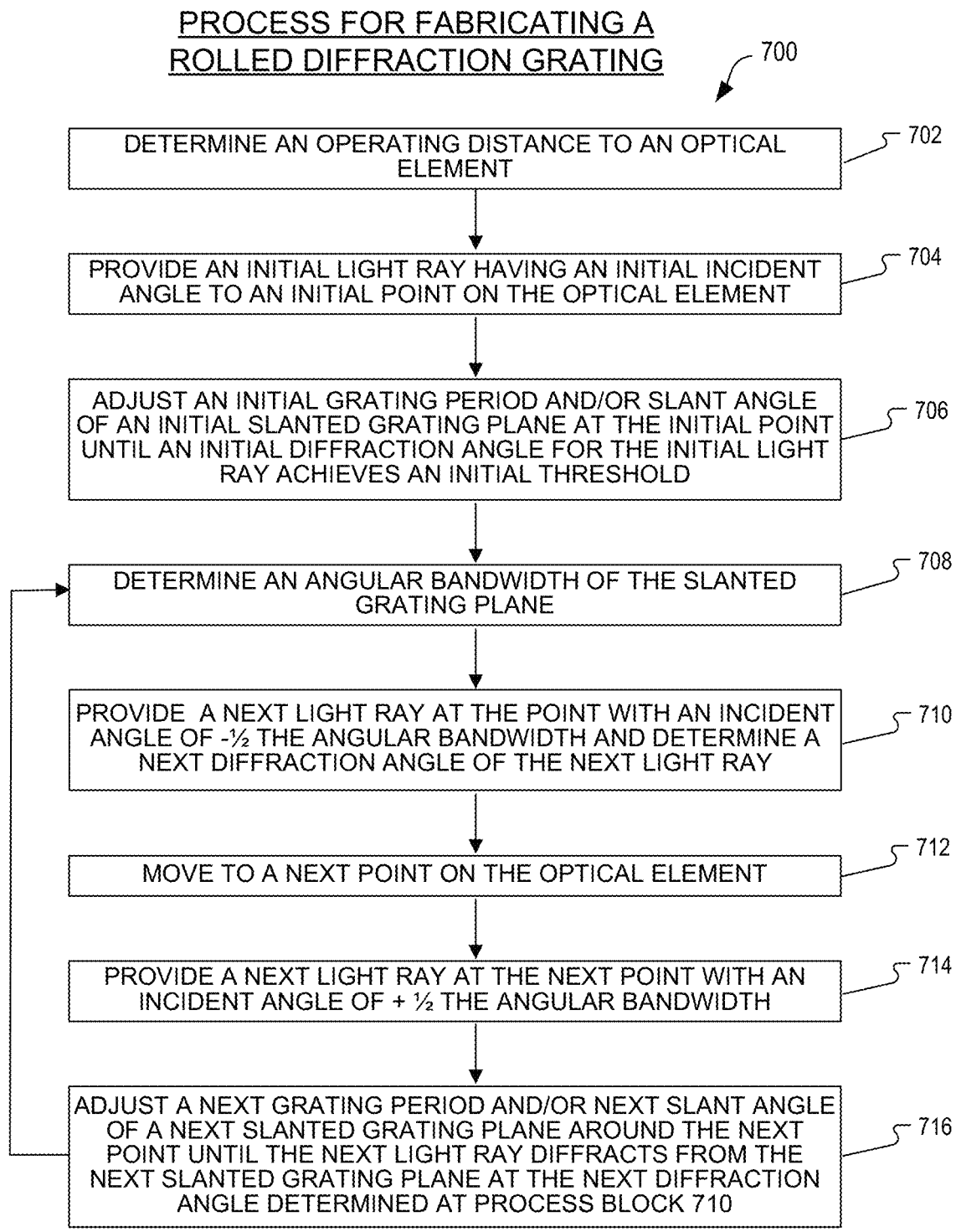
FIG. 7 illustrates a flow diagram of a process for fabricating a rolled diffraction grating, in accordance with aspects of the disclosure.

FIG. 7 illustrates a process 700 for fabricating a rolled diffraction grating, according to an embodiment. Process 700 may be incorporated into one or more fabrication systems including one or more processors and one or more laser controllers configured to record diffraction patterns in a recording medium to create, for example, a volume grating, according to an embodiment. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

At process block 702, process 700 determines an operating distance to an optical element, according to an embodiment. The operating distance may be a distance between the optical element and an eyebox region or eye of a user. The optical element may be a recording medium from which a holographic optical element may be fabricated. Process block 702 may proceed to process block 704, according to an embodiment.

At process block 704, process 700 provides an initial light ray having an initial incident angle to an initial point on the optical element, according to an embodiment. The initial incident angle may be 0°. Process block 704 may proceed to process block 706, according to an embodiment.

At process block 706, process 700 adjusts an initial grating period and/or slant angle of an initial slanted grating plane at the initial point until an initial diffraction angle for the initial light ray achieves an initial threshold, according to an embodiment. The initial threshold may be a predetermined threshold, such as 80°. Process block 706 may proceed to process block 708, according to an embodiment.

At process block 708, process 700 determines an angular bandwidth of the slanted grating plane, according to an embodiment. Process block 708 proceeds to process block 710, according to an embodiment.

At process block 710, process 700 provides a next light ray at the point with an incident angle of −½ the angular bandwidth and determines a next diffraction angle of the next light ray, according to an embodiment. Process block 710 proceeds to process block 712, according to an embodiment.

At process block 712, process 700 moves to a next point on the optical element, according to an embodiment. Process block 712 proceeds to process block 714, according to an embodiment.

At process block 714, process 700 provides a next light ray at the next point with an incident angle of +½ the angular bandwidth, according to an embodiment. Process block 714 proceeds to process block 716, according to an embodiment.

At process block 716, process 700 adjusts a next grating period and/or next slant angle of a next slanted grating plane around the next point until the next light ray diffracts from the next slanted grating plane at the next diffraction angle determined at process block 710, according to an embodiment. Process block 716 proceeds to process block 708, until the next diffraction angle meets or exceeds a critical angle threshold, according to an embodiment.

Figure 8:
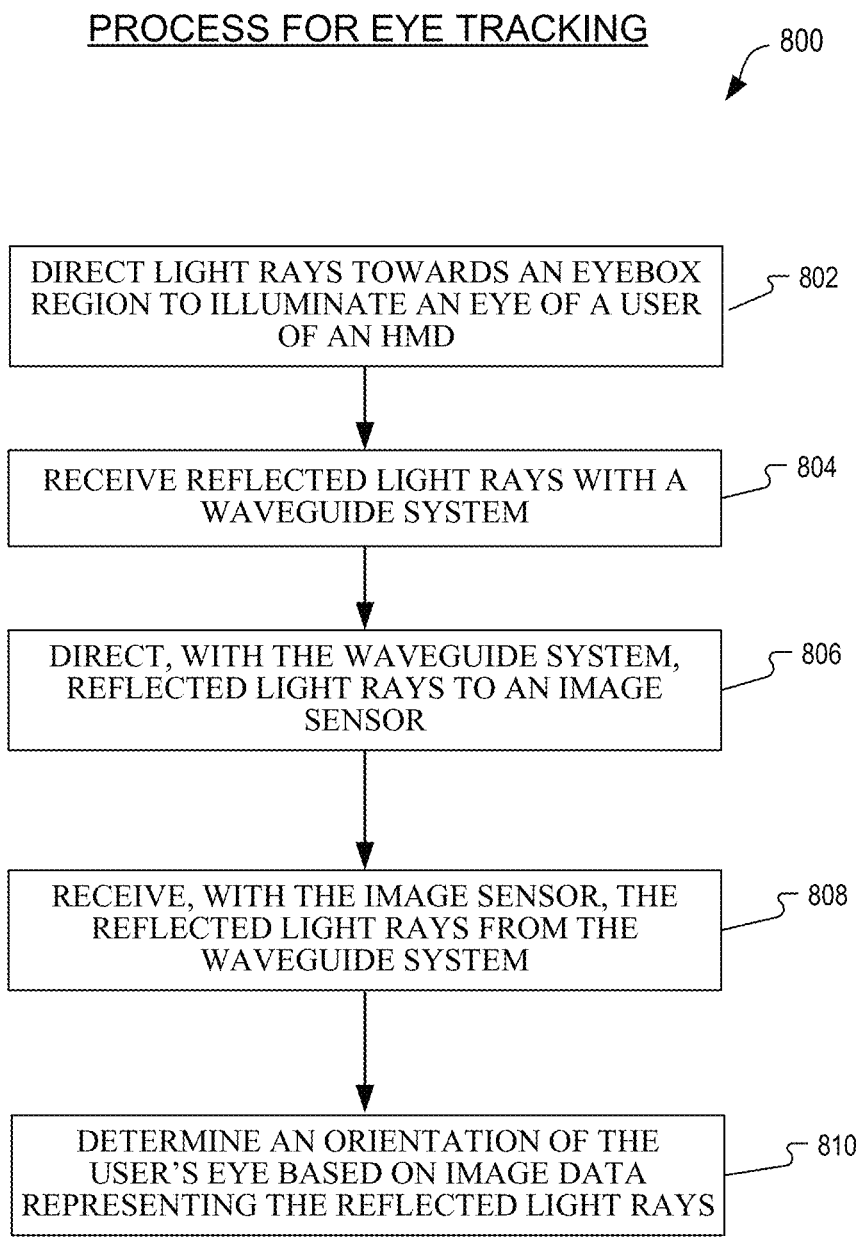
FIG. 8 illustrates a flow diagram of a process for eye tracking, in accordance with aspects of the disclosure.

FIG. 8 illustrates a process 800 for eye tracking, according to an embodiment. Process 800 may be at least partially incorporated into one or more HMDs (e.g., in controller 118) disclosed herein. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel.

At process block 802, process 800 directs light rays towards an eyebox region to illuminate an eye of a user of an HMD, according to an embodiment. Directing light rays towards eyebox region may include emitting infrared light towards eyebox region using one or more light sources (e.g., LEDs). Process block 802 may proceed to process block 804, according to an embodiment.

At process block 804, process 800 receives reflected light rays with a waveguide system, according to an embodiment. The waveguide system may include any of the waveguide systems disclosed herein and may include an in-coupling diffraction grating and an out-coupling diffraction grating positioned on or within a waveguide. The in-coupling diffraction grating and/or the out-coupling diffraction grating may be rolled diffraction gratings, in accordance with aspects of the disclosure. The waveguide system may be at least partially included in a lens assembly and may be at least partially positioned in a frame of an HMD. Process block 804 may proceed to process block 806, according to an embodiment.

At process block 806, process 800 directs, with the waveguide system, reflected light rays to an image sensor, according to an embodiment. The image sensor may be positioned in or on a frame of an HMD to receive the reflected light rays from the waveguide system. Process block 806 may proceed to process block 808, according to an embodiment.

At process block 808, process 800 receives, with the image sensor, the reflected light rays from the waveguide system, according to an embodiment. The image sensor may convert the reflected light rays from optical to electrical signals and save or provide the electrical signals to a controller as image data. Process block 808 proceeds to process block 810, according to an embodiment.

At process block 810, process 800 determines an orientation of the user's eye based on image data representing the reflected light rays, according to an embodiment.

FIGS. 9-13 illustrate embodiments of a wavelength multiplexed waveguide system and a related process, in accordance with aspects of the disclosure. The wavelength multiplexed waveguide system may use multiple wavelength-specific in-coupling diffraction gratings to: i) encode spatial positions of reflections into angles, ii) wavelength encode portions of the eyebox region, and iii) expand the eyebox region from which reflections can be detected.

Figure 9:
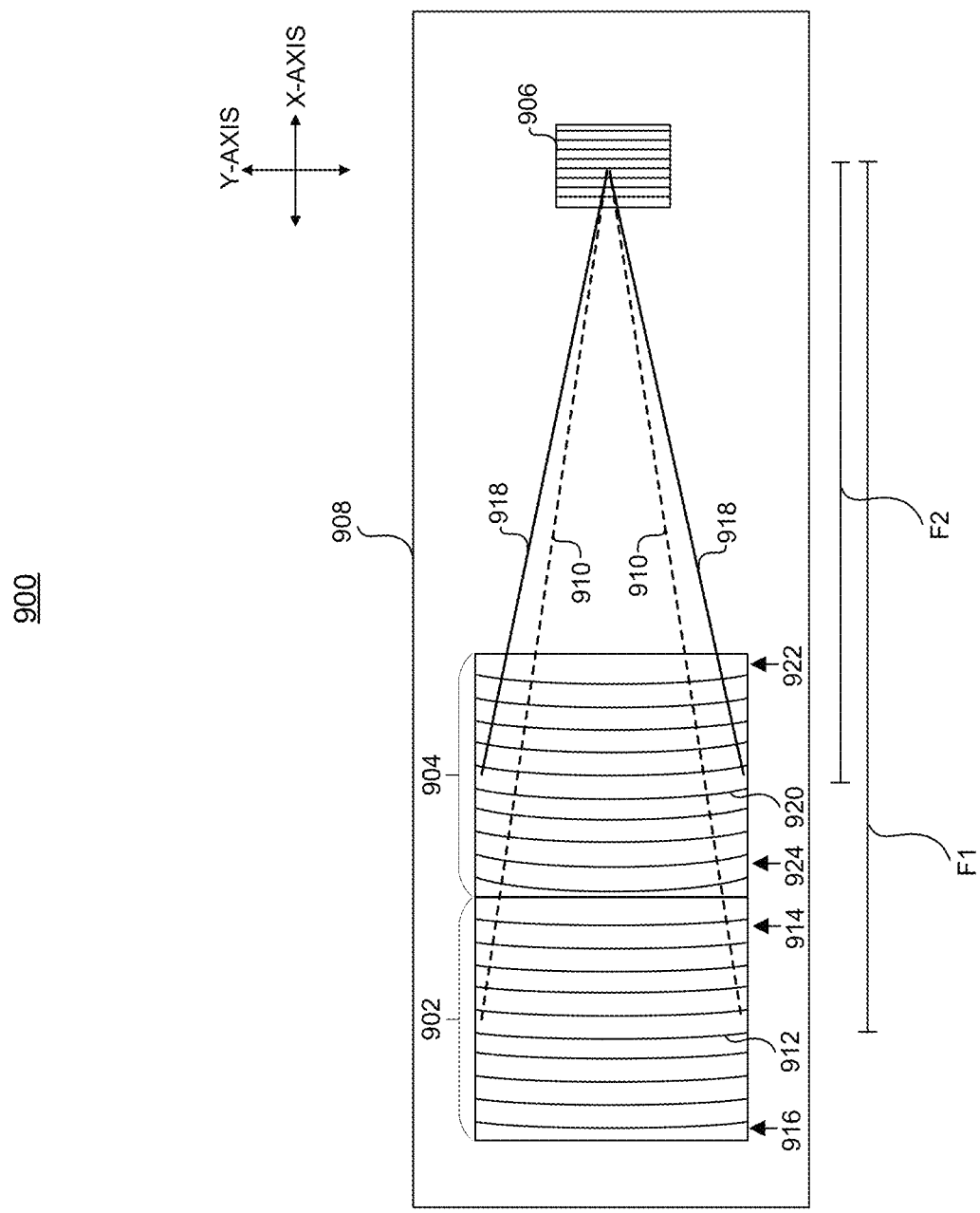
FIG. 9 illustrates a diagram of a top view of a wavelength multiplexed waveguide system, in accordance with aspects of the disclosure.

FIG. 9 illustrates a top view diagram of a wavelength multiplexed waveguide system 900, in accordance with aspects of the disclosure. Wavelength multiplexed waveguide system 900 includes multiple in-coupling diffraction gratings that operate to expand the size or area of an eyebox region from which reflections may be detected, according to an embodiment. The multiple in-coupling diffraction gratings are configured to operate on different wavelengths of light. The multiple in-coupling diffraction gratings are configured to direct received light towards an out-coupling diffraction grating. Each of the multiple in-coupling diffraction gratings can have a different focal length so that diffracted light is focused on the out-coupling grating while the in-coupling diffraction gratings are positioned in different locations within a waveguide. The multiple in-coupling diffraction gratings may be wavelength selective VBGs, which reduces or eliminates cross-talk between the two or more diffraction gratings. The out-coupling diffraction grating may be configured to not be wavelength selective, so the out-coupling diffraction grating may out-couple any wavelengths of light that are diffracted by the in-coupling diffraction gratings. Each diffraction grating can be exposed independently for each wavelength during recording, which may allow tuning Sn (the amplitude of the index modulation) to achieve high diffraction efficiency in each of the in-coupling diffract gratings.

Wavelength multiplexed waveguide system 900 is an example implementation of waveguide system 102 (shown in FIG. 1) and waveguide system 216 (shown in FIGS. 2 and 3). The various techniques described above in relation to FIGS. 4A-8 may be applied to wavelength multiplexed waveguide system 900, in accordance with embodiments of the disclosure. Wavelength multiplexed waveguide system 900 includes a first in-coupling diffraction grating 902, a second in-coupling diffraction grating 904, and an out-coupling diffraction grating 906 disposed in a waveguide 908, according to an embodiment.

First in-coupling diffraction grating 902 is positioned within waveguide 908 and is configured to pass visible light and diffract first-wavelength light 910 (e.g., 1300 nm). First in-coupling diffraction grating 902 is configured to operate in reflection or operate in transmission to diffract first-wavelength light 910 towards out-coupling diffraction grating 906. First-wavelength light 910 may propagate along a first optical path in waveguide 908 towards out-coupling diffraction grating 906 relying on total internal reflection (TIR). First in-coupling diffraction grating 902 is configured to have a focal length F1 to focus first-wavelength light 910 onto out-coupling diffraction grating 906. First in-coupling diffraction grating 902 may have a (e.g., top-view) surface area or two-dimensional footprint that is greater than the surface area or two-dimensional footprint of out-coupling diffraction grating 906, so first in-coupling diffraction grating 902 may be configured to focus first-wavelength light 910 along a longitudinal axis (x-axis) of waveguide 908 as well as along a latitudinal axis (y-axis) of waveguide 908.

To focus first-wavelength light 910 onto out-coupling diffraction grating 906, first in-coupling diffraction grating 902 may include a number of slanted grating planes 912. Slanted grating planes 912 may have slant angles that change from a first end 914 to a second end 916 of first in-coupling diffraction grating 902. Slant angles of slanted grating planes 912 enable first in-coupling diffraction grating 902 to diffract first-wavelength light 910 at different angles depending upon where the light is incident upon first in-coupling diffraction grating 902. Each of slanted grating planes 912 has grating lines and grating periods defined to cause first in-coupling diffraction grating 902 to pass visible light and to diffract first-wavelength light 910. Alternatively, first in-coupling diffraction grating 902 may be configured to diffract a range of wavelengths (e.g., 1250-1350 nm) centered around first-wavelength light 910 (e.g., 1300 nm), according to an embodiment. Slanted grating planes 912 may be arcuately formed and concavely curved towards out-coupling diffraction grating 906 to support focusing light latitudinally along the y-axis of waveguide 908. The arcuate curvature of slanted grating planes 912 may change from an arc having a smaller radius to an arc having a larger radius, from first end 914 to second end 916, to support focusing first-wavelength light 910 onto out-coupling diffraction grating 906, according to an embodiment.

Second in-coupling diffraction grating 904 is positioned within waveguide 908 and is configured to pass visible light and diffract second-wavelength light 918 (e.g., 940 nm).

Second in-coupling diffraction grating 904 is positioned adjacent to first in-coupling diffraction grating 902. Second in-coupling diffraction grating 904 may be in contact with first in-coupling diffraction grating 902 or a gap may exist between in-coupling diffraction gratings 902 and 904. First and second-wavelength light 910 and 918 may be separated by a buffer band of wavelengths (e.g., 200 nm or greater band) to reduce interference and both wavelengths of light may be in the infrared or near-infrared range. Second in-coupling diffraction grating 904 may be configured to operate in reflection or operate in transmission to diffract second-wavelength light 918 towards out-coupling diffraction grating 906. First-wavelength light 910 may propagate from second in-coupling diffraction grating 904 along a second optical path in waveguide 908 towards out-coupling diffraction grating 906 relying on TIR.

Second in-coupling diffraction grating 904 may be configured to have a focal length F2 to focus second-wavelength light 918 onto out-coupling diffraction grating 906. Focal length F2 may be shorter than focal length F1. Second in-coupling diffraction grating 904 may have a (e.g., top-view) surface area or two-dimensional footprint that is greater than the surface area or two-dimensional footprint of out-coupling diffraction grating 906, so second in-coupling diffraction grating 904 may be configured to focus second-wavelength light 918 along the longitudinal axis (x-axis) of waveguide 908 as well as along the latitudinal axis (y-axis) of waveguide 908.

To focus second-wavelength light 918 onto out-coupling diffraction grating 906, second in-coupling diffraction grating 904 may include a number of slanted grating planes 920. Slanted grating planes 920 may have slant angles that change from a first end 922 to a second end 924 of second in-coupling diffraction grating 904. Slant angles of slanted grating planes 920 enable second in-coupling diffraction grating 904 to diffract second-wavelength light 918 at different angles depending upon where the light is incident upon second in-coupling diffraction grating 904. Each of slanted grating planes 920 has grating lines and grating periods defined to cause second in-coupling diffraction grating 904 to pass visible light and to diffract second-wavelength light 918. Alternatively, second in-coupling diffraction grating 904 may be configured to diffract a range of wavelengths (e.g., 890-990 nm) centered around second-wavelength light 918 (e.g., 940 nm), according to an embodiment. Slanted grating planes 920 may be arcuately formed and concavely curved towards out-coupling diffraction grating 906 to support focusing light latitudinally along the y-axis of waveguide 908. The arcuate curvature of slanted grating planes 920 may change from an arc having a smaller radius to an arc having a larger radius, from first end 922 to second end 924, to support focusing second-wavelength light 918 onto out-coupling diffraction grating 906, according to an embodiment.

Out-coupling diffraction grating 906 is positioned in waveguide 908 and is configured to receive first and second wavelength-light 910 and 918. Out-coupling diffraction grating 906 may be positioned a distance of focal length F1 away from first in-coupling diffraction grating 902 and may be positioned a distance of focal length F2 away from second in-coupling diffraction grating 904. Out-coupling diffraction grating 906 may be configured (e.g., with slanted grating planes) to pass visible light and to diffract both first and second-wavelength light 910 and 918. Out-coupling diffraction grating 906 may be enclosed in the frame of a HMD and shielded from external light, so out-coupling diffraction grating 906 may be configured to diffract a range of wavelengths (e.g., near infrared, infrared, and/or visible light). Out-coupling diffraction grating 906 may operate in transmission or may operate in reflection to diffract first and second-wavelength light 910 and 918.

Out-coupling diffraction grating 906 may have a smaller surface area than either of first and second in-coupling diffraction gratings 902 and 904. A smaller surface area of out-coupling diffraction grating 906 enables easier concealment and placement of out-coupling diffraction grating 906 within or on a frame of an HMD, according to an embodiment. The larger surface area of in-coupling diffraction grating 902, 904 may enable reception and in-coupling of more light from an eyebox region of an HMD or from a user's eye for an HMD. Although wavelength multiplexed waveguide system 900 depicts two in-coupling diffraction gratings, waveguide 908 may include two, three, or more in-coupling diffraction gratings (each configured to diffract a different wavelength of light) to expand the area from which light reflections can be in-coupled from an eyebox region, in accordance with aspects of the disclosure.

Figure 10A:
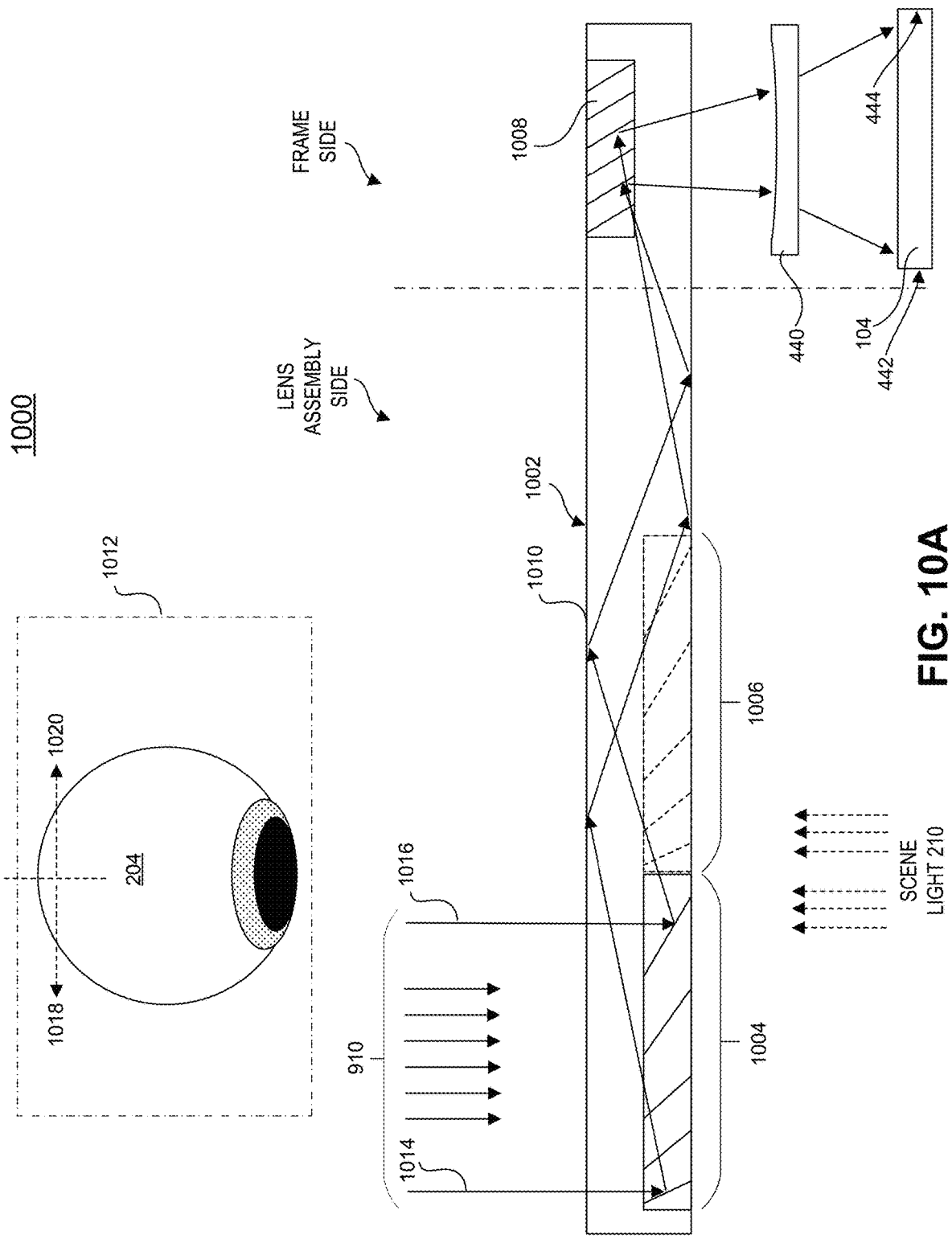
FIGS. 10A, 10B, and 10C illustrate example light ray propagation in a wavelength multiplexed waveguide system that may be used in an HMD to support eye tracking operations, in accordance with aspects of the disclosure.
Figure 10B:
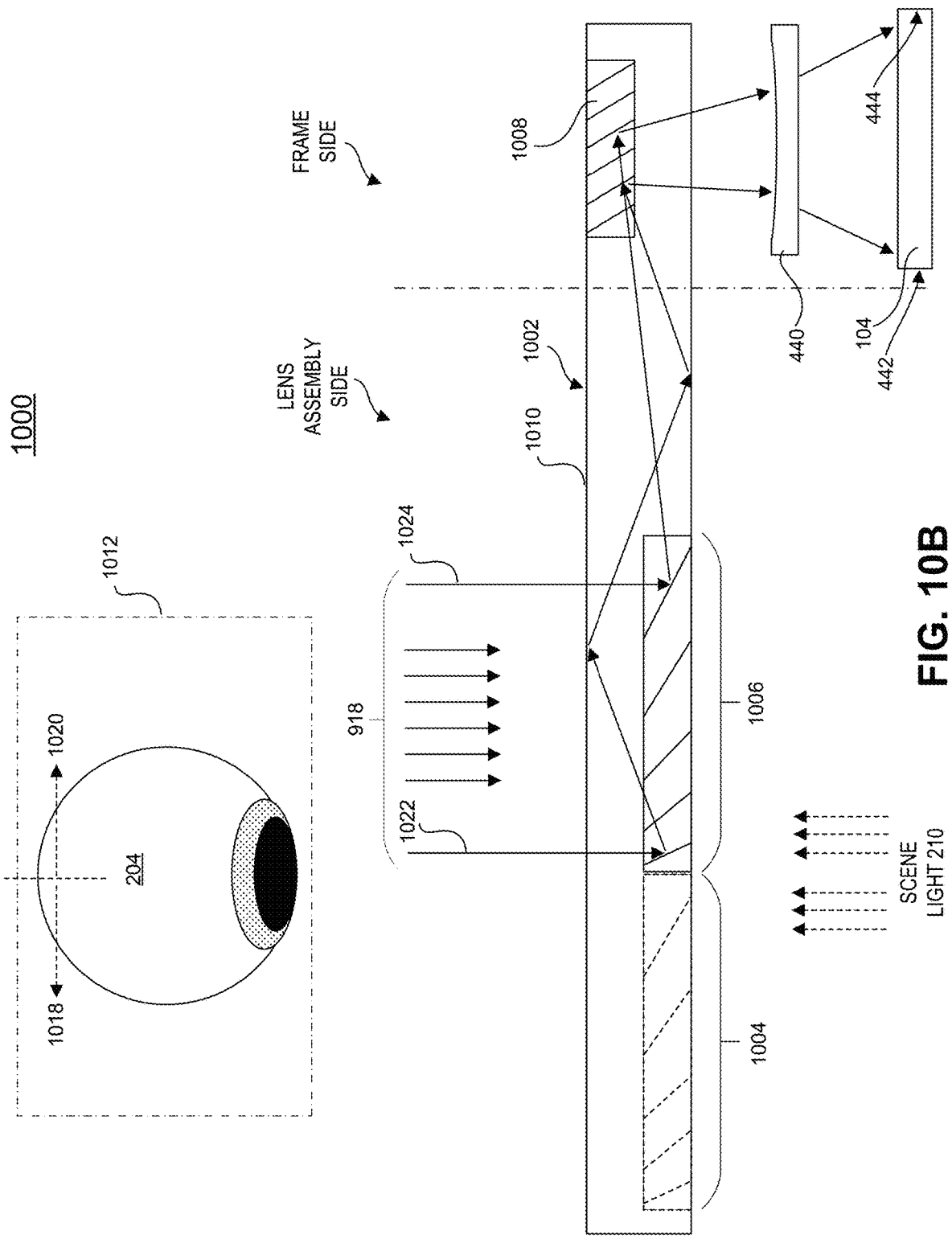
Figure 10C:
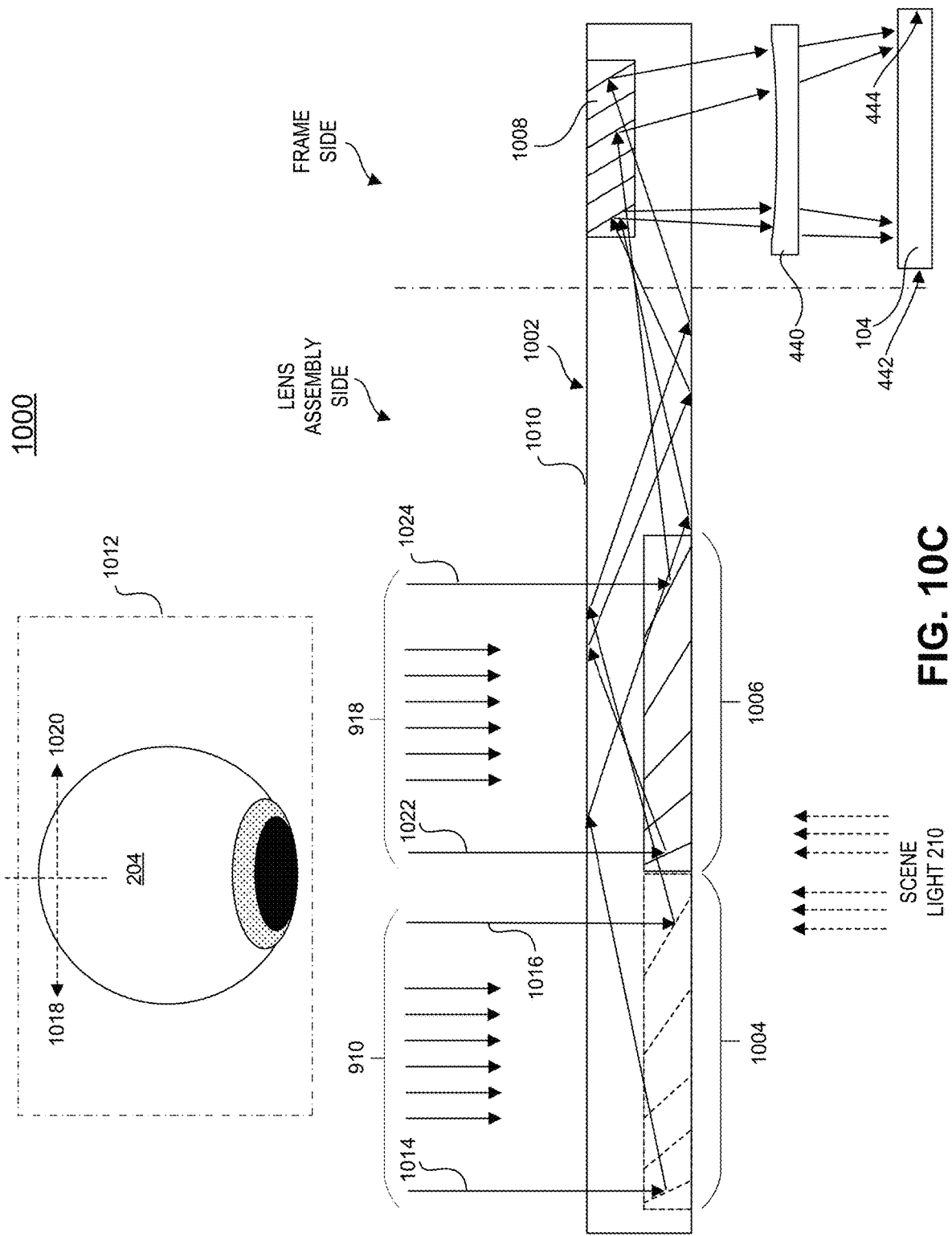

FIGS. 10A, 10B, and 10C illustrate example side-view diagrams of a wavelength multiplexed waveguide imaging system 1000, in accordance with aspects of the disclosure. Wavelength multiplexed waveguide imaging system 1000 includes a wavelength multiplexed waveguide system 1002 that is an example implementation of wavelength multiplexed waveguide system 900 (shown in FIG. 9). Wavelength multiplexed waveguide system 1002 may be configured to operate in reflection to diffract light, for example, using similar techniques described above with reference to waveguide imaging system 450 (shown in FIG. 4B). Wavelength multiplexed waveguide system 1002 includes a first in-coupling diffraction grating 1004, a second in-coupling diffraction grating 1006, and an out-coupling diffraction grating 1008 positioned in a waveguide 1010, according to an embodiment. Wavelength multiplexed waveguide system 1002 is configured to redirect multiple wavelengths of reflected light from eye 204 and/or eyebox 1012 onto image sensor 104, according to an embodiment. By implementing two or more in-coupling diffraction gratings, wavelength multiplexed waveguide system 1002 may operate to detect reflected light from a larger area (e.g., from a larger eyebox region) than traditional or other eye tracking techniques.

FIG. 10A illustrates an example of light ray diffraction by first in-coupling diffraction grating 1004. First-wavelength light 910 may include a light ray 1014 and a light ray 1016 that are representative of first-wavelength light 910. Light rays 1014 and 1016 have a first wavelength, and first in-coupling diffraction grating 1004 is configured to diffract light having the first wavelength. However, the propagation or transmission path of light rays 1014 and 1016 is not affected by second in-coupling diffraction grating 1006 because second in-coupling diffraction grating 1006 may be configured to pass (to not operate on) light having the first wavelength. To illustrate this, second in-coupling diffraction grating 1006 is depicted in broken lines.

First in-coupling diffraction grating 1004 receives first-wavelength light 910 from eyebox region 1012. First in-coupling diffraction grating 1004 may be configured to receive first-wavelength light 910 from a first portion 1018 of eyebox region 1012, and second in-coupling diffraction grating 1006 may be configured to receive second-wavelength light 918 from a second portion 1020 of eyebox region 1012, according to an embodiment. First in-coupling diffraction grating 1004 diffracts light rays 1014 and 1016 in waveguide 1010. Light rays 1014 and 1016 are reflected in waveguide 1010 and propagate to out-coupling diffraction grating 1008. Out-coupling diffraction grating 1008 diffracts light rays 1014 and 1016 towards image sensor 104 (e.g., through lens 440).

FIG. 10B illustrates an example of light ray diffraction by second in-coupling diffraction grating 1006. Second-wavelength light 918 may include a light ray 1022 and a light ray 1024 that are representative of second-wavelength light 918. Light rays 1022 and 1024 have a second wavelength, and second in-coupling diffraction grating 1006 is configured to diffract light having the second wavelength. However, the propagation or transmission path of light rays 1022 and 1024 may be not affected by first in-coupling diffraction grating 1004 because first in-coupling diffraction grating 1004 may be configured to pass (to not operate on) light having the second wavelength. To illustrate this, first in-coupling diffraction grating 1004 is depicted in broken lines.

Second in-coupling diffraction grating 1006 receives second-wavelength light 918 from eyebox region 1012. Second in-coupling diffraction grating 1006 diffracts light rays 1022 and 1024 in waveguide 1010. Light rays 1022 and 1024 are reflected by and in waveguide 1010 and propagate to out-coupling diffraction grating 1008. Out-coupling diffraction grating 1008 diffracts light rays 1022 and 1024 towards image sensor 104 (e.g., through lens 440).

FIG. 10C illustrates an example of wavelength multiplexed diffraction by first in-coupling diffraction grating 1004 and second in-coupling diffraction grating 1006, according to aspects of the disclosure. Based on the configuration of first in-coupling diffraction grating 1004 and second in-coupling diffraction grating 1006, first-wavelength light 910 and second-wavelength light 918 are each diffracted by one but not both of the in-coupling diffraction gratings. Through the implementation of two or more in-coupling diffraction gratings, wavelength multiplexed waveguide imaging system 1000 may enable in-field eye tracking operations that include eye orientation information from a larger, expanded eyebox region 1012 (as compared to traditional techniques).

In consideration of power consumption, eyebox region 1012 may be illuminated using a variety of illumination techniques. In one embodiment, light sources may be operated to illuminate one side of the eyebox region with first-wavelength light or another side of the eyebox region with second-wavelength light, thus wavelength encoding portions of the eyebox. In one embodiment, the HMD operates light sources to illuminate a portion of the eyebox region in which the eye in currently oriented, to reduce wasted power associated with illuminating a portion of the eyebox region where the eye is not oriented. In one embodiment, both wavelengths of light sources are temporarily illuminated, until an eye orientation is initially determined. In one embodiment, HMID operates the light sources to periodically alternate between the first-wavelength light and the second wavelength light. The HMD may be configured to operate the light sources to initially provide both wavelengths of light and then switch to a less power-consuming illumination sequence or mode based on, for example, a determined orientation of the eye.

Although one out-coupling diffraction grating is shown, in some embodiments, wavelength multiplexed waveguide imaging system 1000 may include multiple out-coupling diffraction gratings. The multiple out-coupling diffraction gratings may each be tuned to diffract a particular wavelength of light. For example a first out-coupling diffraction grating may be configured to diffract first-wavelength light, and a second out-coupling diffraction grating may be configured to diffract second-wavelength light. The first and second out-coupling gratings may be positioned side-by-side or one in-front of the other. More than two out-coupling diffraction gratings may be included to wavelength encode the eyebox region with more than two wavelengths of light.

Although a single image sensor is shown, an image sensor for each wavelength may be alternatively used. Each image sensor may be optically coupled to receive light from a corresponding out-coupling diffraction grating. In one embodiment, lenses may be used to direct the first-wavelength light to a first image sensor and to direct the second-wavelength light to a second image sensor, according to an embodiment. Additional image sensors may be used to support wavelength multiplexing with additional wavelengths of light.

Figure 11:
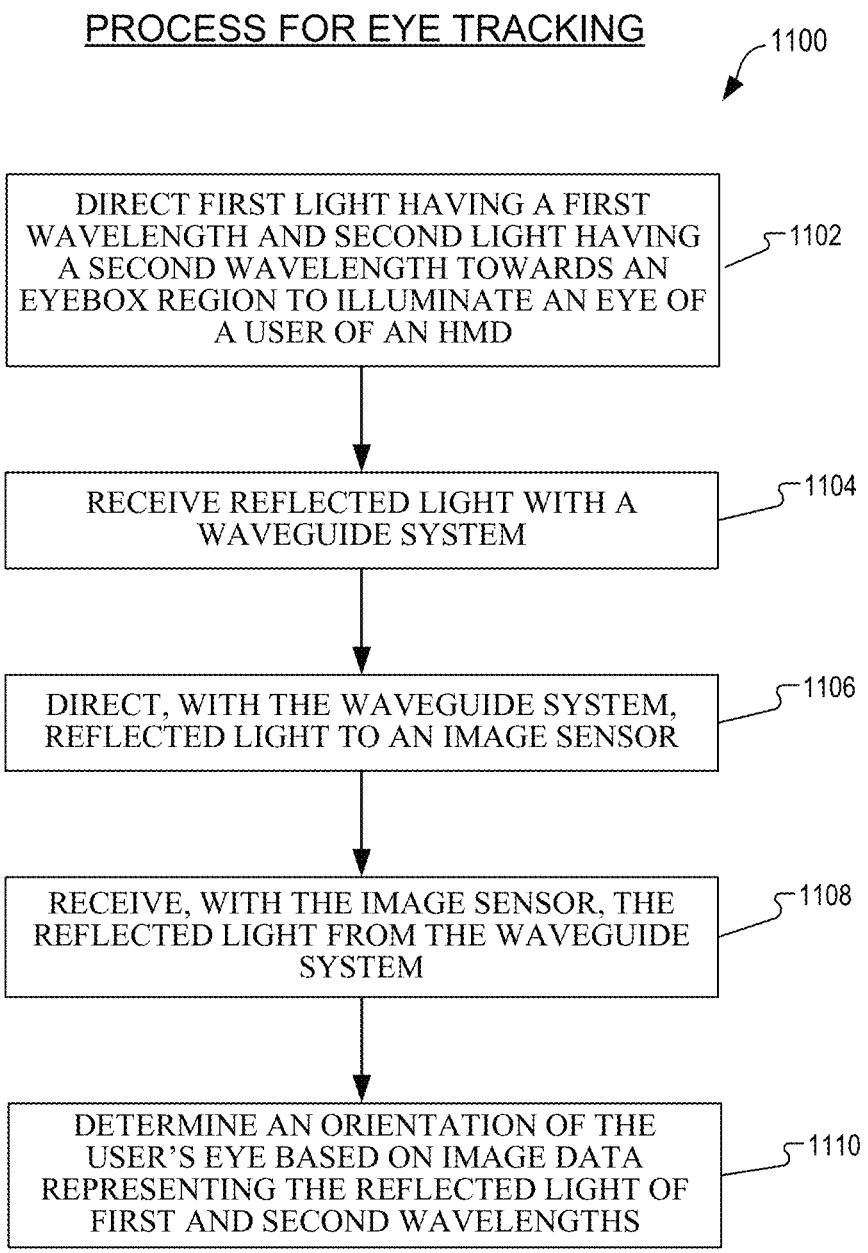
FIG. 11 illustrates a flow diagram of a process for eye tracking, in accordance with aspects of the disclosure.

FIG. 11 illustrates a process 1100 for eye tracking, according to an embodiment. Process 1100 may be at least partially incorporated into one or more HMDs (e.g., in controller 118) disclosed herein. The order in which some or all of the process blocks appear in process 1100 should not be deemed limiting. Rather, one of ordinary skill in the art having the benefit of the present disclosure will understand that some of the process blocks may be executed in a variety of orders not illustrated, or even in parallel.

At process block 1102, process 1100 directs first light having a first wavelength and second light having a second wavelength towards an eyebox region to illuminate an eye of a user of an HMD, according to an embodiment. Directing first and second light towards eyebox region may include emitting infrared light towards eyebox region using two or more light sources (e.g., LEDs). Process block 1102 may proceed to process block 1104, according to an embodiment.

At process block 1104, process 1100 receives reflected light with a waveguide system, according to an embodiment. The reflected light includes first and second light having first and second wavelengths, respectively. The waveguide system may include any of the waveguide systems disclosed herein and may include at least two in-coupling diffraction gratings to in-couple the first and second light from the eyebox region. The waveguide system may also include an out-coupling diffraction grating to direct the light to an image sensor. The diffraction gratings may be positioned in the waveguide and may be rolled diffraction gratings, in accordance with aspects of the disclosure. The waveguide system may be at least partially included in a lens assembly and may be at least partially positioned in a frame of an HMD. Process block 1104 may proceed to process block 1106, according to an embodiment.

At process block 1106, process 1100 directs, with the waveguide system, reflected light to the image sensor, according to an embodiment. The image sensor may be positioned in or on a frame of an HMD to receive the reflected light from the out-coupling diffraction grating of the waveguide system. Process block 1106 may proceed to process block 1108, according to an embodiment.

At process block 1108, process 1100 receives, with the image sensor, the reflected light from the waveguide system, according to an embodiment. The image sensor may convert the reflected light from optical to electrical signals and save or provide the electrical signals to a controller as image data. Process block 1108 proceeds to process block 1110, according to an embodiment.

At process block 1110, process 1100 determines an orientation of the user's eye based on image data representing the reflected light of the first and second wavelengths, according to an embodiment.

Figure 12:
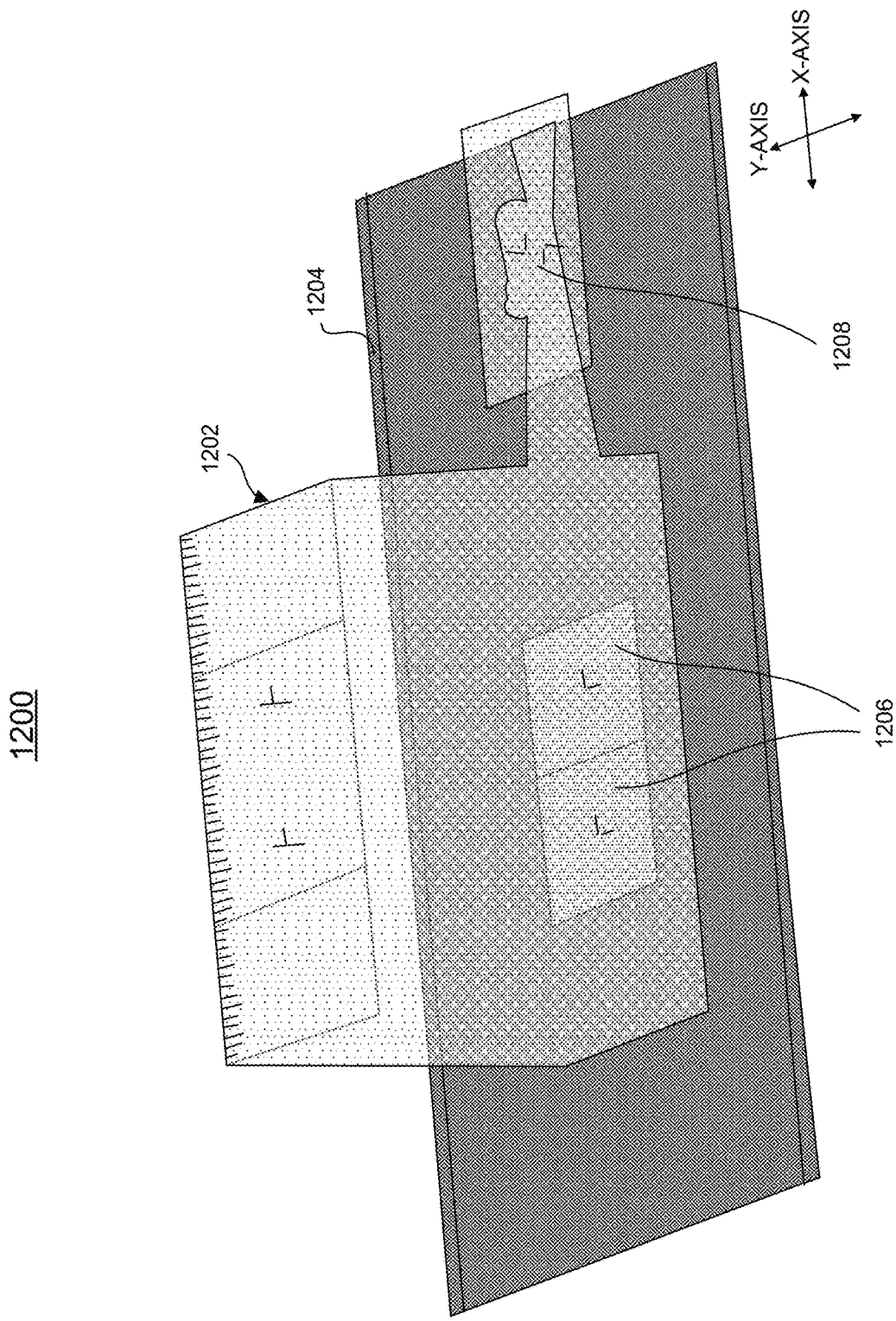
FIG. 12 illustrates a perspective view of light interactions with a wavelength multiplexed waveguide system, in accordance with aspects of the disclosure.

FIG. 12 illustrates a perspective view of light interactions with a wavelength multiplexed waveguide system 1200, in accordance with aspects of the disclosure. Wavelength multiplexed waveguide system 1200 shows light 1202 coming from an eyebox region. Light 1202 is received by waveguide 1204 having multiple in-coupling diffraction gratings 1206 that direct portions of light 1202 towards an out-coupling diffraction grating 1208, according to an embodiment.

Figure 13:
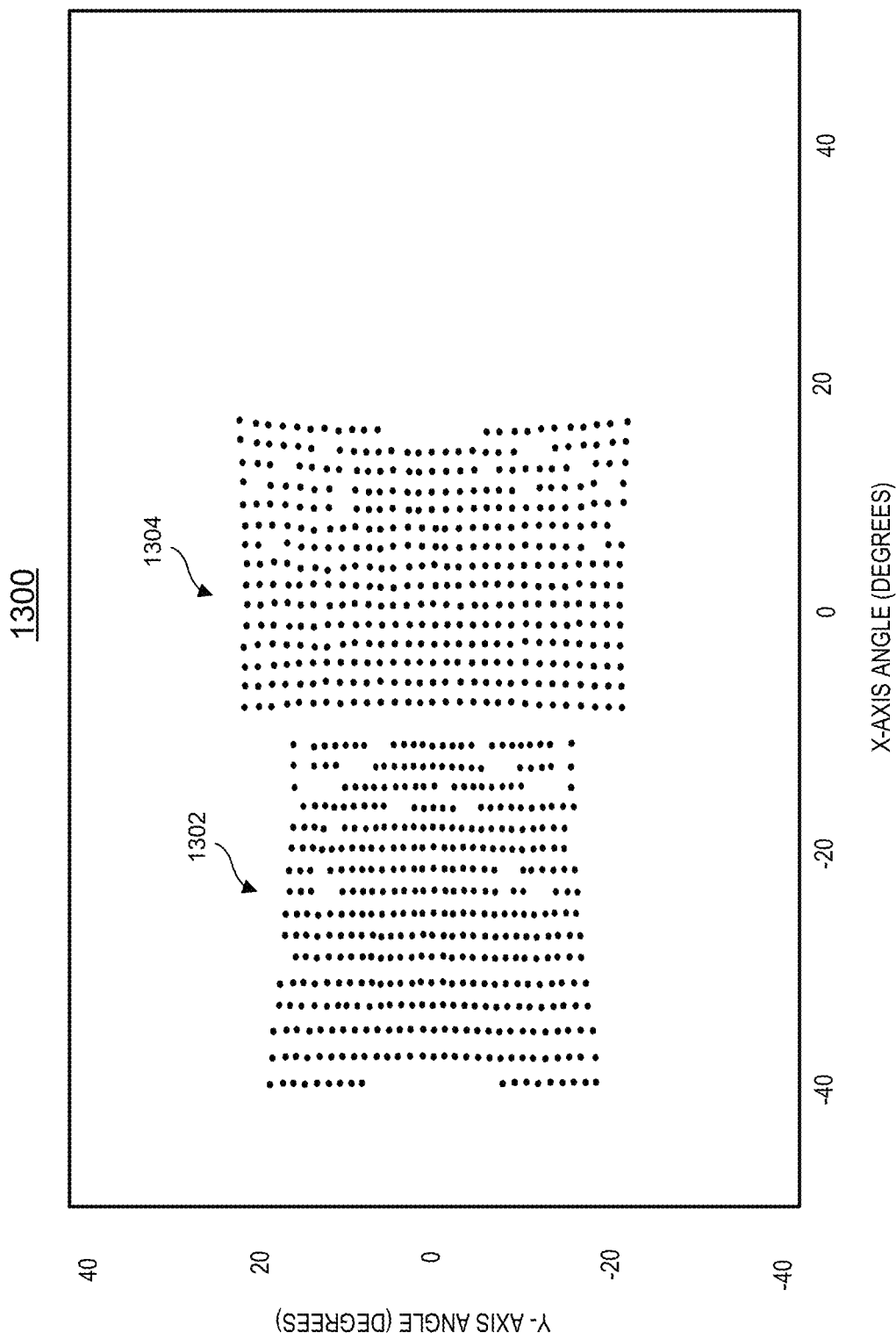
FIG. 13 illustrates a diagram representing spatial locations of eye reflections that are mapped to angles in the wavelength multiplexed waveguide system of FIG. 12, in accordance with aspects of the disclosure.

FIG. 13 illustrates a diagram 1300 representing spatial locations of eye reflections that are mapped to angles in a waveguide, in accordance with aspects of the disclosure. Light clusters 1302 and 1304 represent spatial locations of light that are received by multiple in-coupling diffraction gratings 1206 and that are then redirected (in the waveguide) to out-coupling diffraction grating 1208. Light clusters 1302 are representative of light that is received from one of multiple in-coupling diffraction gratings 1206, and light clusters 1304 is representative of light that is received from the other of multiple in-coupling diffraction gratings 1206. The location, quantity, and pattern formed by light clusters 1302 and 1304 may change with changes to the orientation of the eye in the eyebox region.

Diagram 1300 includes an x-axis angle and a y-axis angle of mapped light. The x-axis angle represents the diffraction angle that an in-coupling diffraction grating diffracts incident light in the longitudinal x-axis direction of the waveguide. The y-axis angle represents diffraction of incident light along the latitudinal y-axis (towards the center of the waveguide). The x-axis angle may also represent angles of incidence of light rays upon the out-coupling diffraction grating along the x-axis of the waveguide. The y-axis angle may also represent angles of incidence of light rays upon the out-coupling diffraction grating along the y-axis of the waveguide. Light clusters 1302 and 1304 show that in-coupling diffraction gratings encode (or map) a spatial position of eye reflections to a diffraction angle within the waveguide and show that the out-coupling grating decodes the positions as light that is directed to an image sensor. Light clusters 1302 and 1302 may represent clusters of pixels in an image sensor that respond to light from out-coupling diffraction grating. Diagram 1300 can be used to help decode the origin of a particular reflection of a light ray and may be considered a decoding map that may be used to reconstruct the images of the eyebox region. Additionally, since different wavelengths may be used to illuminate different portions of the eyebox, the disclosed techniques may use different wavelengths to encode (location to angle) different portions of the eyebox, in accordance with embodiments of the disclosure.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (IMD) connected to a host computer system, a standalone AMD, a mobile device or computing system, or any other hardware platform capable of providing artificial reality content to one or more viewers.

The term "processing logic" (e.g., controller 118, processing logic 120) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g., memories 122) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A lens assembly comprising:
   a waveguide;
   a first diffraction grating disposed in the waveguide and configured to in-couple first light into the waveguide from an eyebox region, the first light having a first wavelength;
   a second diffraction grating disposed in the waveguide and configured to in-couple second light into the waveguide from the eyebox region, the second light having a second wavelength separated from the first wavelength by a buffer band, wherein the second diffraction grating is positioned adjacent to the first diffraction grating and disposed in a same plane as the first diffraction grating; and
   a third diffraction grating disposed in the waveguide and configured to out-couple the first and second light from the waveguide to an image sensor, wherein the first diffraction grating has a first focal length to focus the first light to the third diffraction grating, and wherein the second diffraction grating has a second focal length to focus the second light to the third diffraction grating, the first focal length being longer than the second focal length, wherein a two-dimensional footprint of the third diffraction grating is smaller than the first diffraction grating and the second diffraction grating.

2. The lens assembly of claim 1, wherein a first optical path of the first light focused to the third diffraction grating relies on total internal reflection (TIR) of the waveguide to propagate to the third diffraction grating, and wherein a second optical path of the second light focused to the third diffraction grating relies on the TIR of the waveguide to propagate to the third diffraction grating.

3. The lens assembly of claim 1, wherein the first diffraction grating is configured to in-couple the first light from a first portion of the eyebox region, wherein the second diffraction grating is configured to in-couple the second light from a second portion of the eyebox region.

4. The lens assembly of claim 1, wherein the first wavelength is approximately 1300 nm and the second wavelength is approximately 940 nm.

5. The lens assembly of claim 1, wherein the eyebox region is illuminated with first light sources configured to emit light at approximately 1300 nm and with second light sources configured to emit light at approximately 940 nm.

6. The lens assembly of claim 1, wherein the first diffraction grating is a first holographic optic element, wherein the second diffraction grating is a second holographic optical element, wherein the first holographic optical element includes a first plurality of slanted grating planes configured to pass visible light and diffract the first light towards a third diffraction grating in the waveguide, wherein the second holographic optical element includes a second plurality of slanted grating planes configured to pass visible light and diffract the second light towards the third diffraction grating in the waveguide.

7. The lens assembly of claim 6, wherein the first plurality of slanted grating planes are configured to diffract the first light with a first focal length, wherein the second plurality of slanted grating planes are configured to diffract the second light with a second focal length.

8. The lens assembly of claim 6, wherein an arcuate curvature of the first plurality of slanted grating planes has a small radius arc on a first end of the first diffraction grating, and wherein the first plurality of slanted grating planes has a larger radius arc on a second end of the first diffraction grating, the first end of the first diffraction grating being closer to the third diffraction grating than the second end of the first diffraction grating.

9. The lens assembly of claim 1, wherein at least one of the first diffraction grating and the second diffraction grating diffractively operate in reflection.

10. The lens assembly of claim 1, wherein the first and second diffraction gratings are volume Bragg gratings.

11. The lens assembly of claim 1, wherein the buffer band is 200 nm or greater.

12. The lens assembly of claim 1, wherein the first diffraction grating is configured to receive the first light without the first light propagating through the second diffraction grating, and wherein the second diffraction grating is configured to receive the second light without the second light propagating through the first diffraction grating.

13. The lens assembly of claim 1, wherein the first diffraction grating is positioned a first distance of the first focal length away from the third diffraction grating, and wherein the second diffraction grating is positioned a second distance of the second focal length away from the third diffraction grating.

14. An eye tracking system comprising:
   a controller configured to determine an eye orientation based on image data;
   a waveguide system including:
      a waveguide;
      a first diffraction grating disposed in the waveguide and configured to in-couple first light into the waveguide from an eyebox region, the first light having a first wavelength; and
      a second diffraction grating disposed in the waveguide and configured to in-couple second light into the waveguide from the eyebox region, the second light having a second wavelength separated from the first wavelength by a buffer band, wherein the second diffraction grating is positioned adjacent to the first diffraction grating and disposed in a same plane as the first diffraction grating;
   first light sources configured to emit the first light to the eyebox region;
   second light sources configured to emit the second light to the eyebox region; and
   an image sensor optically coupled to the waveguide system to receive the first and second light from the waveguide, wherein the image sensor is configured to generate the image data, and wherein the controller is configured to selectively operate the first light sources or the second light sources based on the eye orientation in the eyebox region.

15. The eye tracking system of claim 14, further comprising:
   a third diffraction grating disposed in the waveguide and configured to out-couple the first and second light from the waveguide to the image sensor, wherein the first diffraction grating has a first focal length to focus the first light to the third diffraction grating, and wherein the second diffraction grating has a second focal length to focus the second light to the third diffraction grating, the first focal length being longer than the second focal length.

16. The eye tracking system of claim 15, wherein a two-dimensional footprint of the third diffraction grating is smaller than the first diffraction grating and the second diffraction grating.

17. The eye tracking system of claim 15, wherein the first wavelength is approximately 1300 nm and the second wavelength is approximately 940 nm.

18. A head mounted device comprising:
- a frame;
- a lens assembly coupled to the frame and configured to transmit scene light to an eyebox region;
- a waveguide system coupled to the lens assembly and to the frame, wherein the waveguide system includes:
  - a waveguide;
  - a first diffraction grating disposed in the waveguide and configured to in-couple first light into the waveguide from the eyebox region, the first light having a first near-infrared wavelength;
  - a second diffraction grating disposed in the waveguide and configured to in-couple second light into the waveguide from the eyebox region, the second light having a second near-infrared wavelength separated from the first near-infrared wavelength by a buffer band, wherein the first diffraction grating is configured to receive the first light without the first light propagating through the second diffraction grating, and wherein the second diffraction grating is configured to receive the second light without the second light propagating through the first diffraction grating; and
  - a third diffraction grating disposed in the waveguide and configured to out-couple the first and second light from the waveguide to an image sensor, wherein the first diffracting grating has a first focal length to focus the first light to the third diffraction grating, and wherein the second diffraction grating has a second focal length to focus the second light to the third diffraction grating, the first focal length being longer than the second focal length, wherein a two-dimensional footprint of the third diffraction grating is smaller than the first diffraction grating and the second diffraction grating; and
- an image sensor positioned in the frame to generate image data from the first and second light received from the waveguide.

* * * * *